(12) United States Patent
Terada et al.

(10) Patent No.: US 8,156,531 B2
(45) Date of Patent: Apr. 10, 2012

(54) RECEIVING DEVICE, SERVER, TELEVISION RECEIVER, MOBILE TERMINAL, SYSTEM, RECEIVING METHOD, INFORMATION PROCESSING PROGRAM, AND STORAGE MEDIUM

(75) Inventors: Satoshi Terada, Nara (JP); Takanobu Matsubara, Osaka (JP); Ryouta Yagi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 674 days.

(21) Appl. No.: 12/089,183

(22) PCT Filed: Oct. 6, 2006

(86) PCT No.: PCT/JP2006/320130
§ 371 (c)(1),
(2), (4) Date: Jun. 24, 2008

(87) PCT Pub. No.: WO2007/043483
PCT Pub. Date: Apr. 19, 2007

(65) Prior Publication Data
US 2010/0138873 A1 Jun. 3, 2010

(30) Foreign Application Priority Data
Oct. 7, 2005 (JP) ................................. 2005-295770

(51) Int. Cl.
*H04N 5/445* (2006.01)
*H04N 7/173* (2006.01)
*H04N 7/16* (2006.01)

(52) U.S. Cl. .............. 725/100; 725/51; 725/57; 725/86; 725/97; 725/142

(58) Field of Classification Search .................... 725/40, 725/47, 57, 86, 97, 100, 142
See application file for complete search history.

(56) References Cited

U.S. PATENT DOCUMENTS

| | | |
|---|---|---|
| 5,559,549 A | 9/1996 | Hendricks et al. |
| 5,600,364 A | 2/1997 | Hendricks et al. |
| 5,600,573 A | 2/1997 | Hendricks et al. |
| 5,659,350 A | 8/1997 | Hendricks et al. |

(Continued)

FOREIGN PATENT DOCUMENTS

CN 1155236 C 6/2004

(Continued)

OTHER PUBLICATIONS

Junko Kuramochi et al. "Proposed Interface, Application of User Motivating Factors" Compilation of Submitted Papers for 23rd Conference, Japan Cognitive Science Society Published on May 20, 2006. Presented in the Conference on Aug. 2, 2006, pp. 76-81.

(Continued)

*Primary Examiner* — Kieu Oanh T Bui
(74) *Attorney, Agent, or Firm* — Birch, Stewart, Kolasch & Birch, LLP

(57) ABSTRACT

A receiving device receives broadcast, information, etc. in response to a user selection by manipulation, in order to present the broadcast, information, etc. to the user. The device includes a channel set managing section (30) which collectively handles multiple channels corresponding to broadcast and content on the Internet or another network received by a receiving device (100) as channel groups which are preset handling units according to certain rules. The user can readily handle large numbers of channels when compared with cases where increasing channels are all handled equally without being grouped.

22 Claims, 33 Drawing Sheets

U.S. PATENT DOCUMENTS

| | | |
|---|---|---|
| 5,682,195 A | 10/1997 | Hendricks et al. |
| 5,734,853 A | 3/1998 | Hendricks et al. |
| 5,798,785 A | 8/1998 | Hendricks et al. |
| 5,986,690 A | 11/1999 | Hendricks |
| 5,990,883 A | 11/1999 | Byrne et al. |
| 5,990,927 A | 11/1999 | Hendricks et al. |
| 6,052,554 A | 4/2000 | Hendricks et al. |
| 6,160,989 A | 12/2000 | Hendricks et al. |
| 6,175,362 B1 | 1/2001 | Harms et al. |
| 6,181,335 B1 | 1/2001 | Hendricks et al. |
| 6,201,536 B1 | 3/2001 | Hendricks et al. |
| 6,374,177 B1 | 4/2002 | Lee et al. |
| 6,408,437 B1 | 6/2002 | Hendricks et al. |
| 6,463,585 B1 | 10/2002 | Hendricks et al. |
| 6,515,680 B1 | 2/2003 | Hendricks et al. |
| 6,539,548 B1 | 3/2003 | Hendricks et al. |
| 6,557,173 B1 | 4/2003 | Hendricks |
| 6,690,391 B1 | 2/2004 | Proehl et al. |
| 6,725,022 B1 | 4/2004 | Clayton et al. |
| 6,728,531 B1 | 4/2004 | Lee et al. |
| 6,738,978 B1 | 5/2004 | Hendricks et al. |
| 6,799,201 B1 | 9/2004 | Lee et al. |
| 6,828,993 B1 | 12/2004 | Hendricks et al. |
| 6,829,475 B1 | 12/2004 | Lee et al. |
| 7,013,478 B1 | 3/2006 | Hendricks et al. |
| 7,017,178 B1 | 3/2006 | Hendricks et al. |
| 7,073,187 B1 | 7/2006 | Hendricks et al. |
| 7,134,131 B1 | 11/2006 | Hendricks et al. |
| 7,168,084 B1 | 1/2007 | Hendricks et al. |
| 7,207,053 B1 | 4/2007 | Asmussen |
| 7,207,055 B1 | 4/2007 | Hendricks et al. |
| 7,260,829 B1 | 8/2007 | Hendricks et al. |
| 7,269,841 B1 | 9/2007 | Hendricks et al. |
| 7,298,851 B1 | 11/2007 | Hendricks et al. |
| 2001/0022839 A1 | 9/2001 | Ishigaki |
| 2002/0040471 A1 | 4/2002 | Hendricks |
| 2002/0040472 A1 | 4/2002 | Hendricks |
| 2002/0040473 A1 | 4/2002 | Hendricks |
| 2002/0042923 A1 | 4/2002 | Asmussen et al. |
| 2002/0042925 A1 | 4/2002 | Ebisu et al. |
| 2002/0104083 A1 | 8/2002 | Hendricks et al. |
| 2002/0112249 A1 | 8/2002 | Hendricks et al. |
| 2002/0144289 A1 | 10/2002 | Taguchi et al. |
| 2002/0196268 A1 | 12/2002 | Wolff et al. |
| 2002/0196364 A1 | 12/2002 | Hendricks |
| 2003/0117445 A1 | 6/2003 | Hendricks et al. |
| 2003/0145323 A1 | 7/2003 | Hendricks et al. |
| 2003/0153992 A1 | 8/2003 | Maruyama et al. |
| 2003/0234804 A1 | 12/2003 | Parker et al. |
| 2004/0111742 A1 | 6/2004 | Hendricks et al. |
| 2004/0135819 A1 | 7/2004 | Maa |
| 2004/0174390 A1 | 9/2004 | Shah |
| 2004/0187149 A1* | 9/2004 | Halgas, Jr. ................. 725/38 |
| 2004/0268413 A1 | 12/2004 | Reid et al. |
| 2005/0154988 A1 | 7/2005 | Proehl et al. |
| 2005/0157217 A1 | 7/2005 | Hendricks |
| 2005/0273833 A1* | 12/2005 | Soinio ........................ 725/113 |
| 2006/0150094 A1 | 7/2006 | Patrawala |
| 2006/0218608 A1 | 9/2006 | Miura et al. |
| 2007/0016923 A1* | 1/2007 | Kwon ........................ 725/38 |
| 2007/0183430 A1 | 8/2007 | Asmussen |
| 2007/0201702 A1 | 8/2007 | Hendricks et al. |
| 2007/0277201 A1* | 11/2007 | Wong et al. ................ 725/40 |
| 2009/0210791 A1 | 8/2009 | Proehl et al. |
| 2009/0210792 A1 | 8/2009 | Proehl et al. |

FOREIGN PATENT DOCUMENTS

| | | |
|---|---|---|
| EP | 1 176 817 A2 | 1/2002 |
| EP | 1 947 855 A1 | 7/2008 |
| JP | 04-044475 A | 2/1992 |
| JP | 07-288795 A | 10/1995 |
| JP | 08-506941 A1 | 7/1996 |
| JP | 09-083891 A | 3/1997 |
| JP | 10-307838 A | 11/1998 |
| JP | 2000-287179 A | 10/2000 |
| JP | 2001-117692 A | 4/2001 |
| JP | 2001-134530 A | 5/2001 |
| JP | 2001-245351 A | 9/2001 |
| JP | 2001-290731 A | 10/2001 |
| JP | 2002-44536 A | 2/2002 |
| JP | 2002-82746 A | 3/2002 |
| JP | 2002-190992 A | 7/2002 |
| JP | 2003-23576 A | 1/2003 |
| JP | 2003-122490 A | 4/2003 |
| JP | 2003-526971 A | 9/2003 |
| JP | 2004-21326 A | 1/2004 |
| JP | 2005-33699 A | 2/2005 |
| JP | 2005-45592 A | 2/2005 |
| KR | 2006-0033078 A | 4/2006 |
| WO | WO-94/14282 A1 | 6/1994 |
| WO | WO-01/22712 A1 | 3/2001 |
| WO | WO 2005/084023 A1 | 9/2005 |

OTHER PUBLICATIONS

Search Report for corresponding European Patent Application No. 06811457.8 dated Aug. 2, 2010.

Japanese Office Action for Application No. 2007-539928 dated Dec. 7, 2010.

Shinji Shiota, Windows 98 de hajimeru kaiteki internetto Katsuyouhen (Start Comfortable Internet with Windows 98, Applications) Internet ASCII, vol. 3, No. 10, ASCII Corporation, Japan, 3 pages.

WWW Brauza Shinjidai Korede wakaru Internet Explorer 4.0 & Netscape Communicator 4.0, (New Era of WW Browser! Guide to Understanding Internet Explorer 4.0 & Netscape Communicator 4.0), PC Work!, vol. 4, No. 11, Nov. 18, 1997, 3 pages.

* cited by examiner

FIG. 4 net.ind

```
<ind>
  <channelset about="http://www.sharp.co.jp/net_favo.csd">
    <title>Favorites</title>
    <link>http://www.sharp.co.jp/</link>
    <dc:identifier>net_favo</dc:identifier>
  </channelset>

<channelset about="http://www.sharp.co.jp/net_reco.csd">
    <title>Recommended Channel Set</title>
    <link>http://www.sharp.co.jp/</link>
    <dc:identifier>net_reco</dc:identifier>
  </channelset>
</ind>
```

FIG. 5 net_reco.csd

```
<csd>
 <channelset>
   <title>Recommended Channels</title>
   <link>http://www.sharp.co.jp/</link>
   <dc:creator>SHARP</dc:creator>
   <description>Recommended Channels from Sharp</description>

<channels>
     <count>2</count>
   </channels>
 </channelset>

<channel about=" http://www.sharp.co.jp/">
   <title>Sharp Corp.</title>
   <link>http://www.sharp.co.jp/</link>
   <dc:type>NetContentsApp</dc:type>
   <dc:identifier>001</dc:identifier>
   <accesskey>1</accesskey>
   <icon>http://www.sharp.co.jp/image/logo_sharp.gif</icon>
 </channel>

<channel about=" https://aquos.jp/" >
   <title>AQUOS.jp</title>
   <link>https://aquos.jp/</link>
   <dc:type>NetContentsApp</dc:type>
   <dc:identifier>002</dc:identifier>
   <accesskey>2</accesskey>
   <icon>http://www.sharp.co.jp/image/logo_sharp.gif</icon>
 </channel>
</csd>
```

FIG. 8 (a) net_reco.csd

```
<csd>
  <channelset>
    ...
  </channelset>

<channel>
    <title>AQUOS.jp</title>
    <dc:identifier>002</dc:identifier>
    ...
    <prevch>101</prevch>
    <nextch>205</nextch>
    ...
  </channel>
  ...
</csd>
```

FIG. 8 (b) net_reco.csd

```
<csd>
  <channelset>
    ...
  </channelset>

<channel>
    <title>AQUOS.jp</title>
    <dc:identifier>002</dc:identifier>
    ...
    <relch>
      <dc:identifier>301</dc:identifier>
      <dc:identifier>302</dc:identifier>
      <dc:identifier>303</dc:identifier>
      <dc:identifier>304</dc:identifier>
      <dc:identifier>305</dc:identifier>
    </relch>
    ...
  </channel>
  ...
</csd>
```

FIG. 8 (c) net_reco.csd

```
<csd>
  <channelset>
    ...
  </channelset>

<channel>
    <title>AQUOS.jp</title>
    <link>childchannel.csd</link>
    <dc:identifier>002</dc:identifier>
    ...
  </channel>
  ...
</csd>
```

FIG. 11 net_reco.csd

```
<csd>                                                      101
  <channelset about="http://www.sharp.co.jp/net_reco.csd">
    <title>Recommend Channels</title>
    <link>http://www.sharp.co.jp/</link>
    <dc:creator>SHARP</dc:creator>
    <description>Recommended Channels from Sharp</description>

<sy:updatePeriod>hourly</sy:updatePeriod>
    <sy:updateFrequency>2</sy:updateFrequency>
    <sy:updateBase>2000-01-01T12:00+00:00</sy:updateBase>
                                                           102
    <channels>
      <count>2</count>
    </channels>
  </channelset>

<channel about=" http://www.sharp.co.jp/">
    ...
  </channel>
</csd>
```

FIG. 13 (a)

net_reco.csd

```
<csd>
  <channelset about="http://www.sharp.co.jp/net_reco.csd">
    <title>Recommend Channels</title>
    ...
    <update about="https://www.sharp.co.jp/net_ssl.csd"
            security="TLS1.0" encryption="DES">
      <sy:updatePeriod>hourly</sy:updatePeriod>
      <sy:updateFrequency>2</sy:updateFrequency>
      <sy:updateBase>2005-10-01T16:34+00:00</sy:updateBase>
    </update>

</channelset>
  ...
</csd>
```

FIG. 13 (b)

net_reco.csd

```
<csd>
  <channelset about="http://www.sharp.co.jp/net_reco.csd">
    <title>Recommend Channels</title>
    ...

<update about="https://www.sharp.co.jp/net_v10.csd" version="1.0">
      <sy:updateBase>2005-10-01T16:34+00:00</sy:updateBase>
    </update>
    <update about="https://www.sharp.co.jp/net_v20.csd" version="2.0">
      <sy:updateBase>2005-10-01T16:34+00:00</sy:updateBase>
    </update>

</channelset>
  ...
</csd>
```

FIG. 15 (a)

net_reco.csd

```
<csd>
 <channelset>
   <title> Recommend Channels</title>
   <link>http://www.sharp.co.jp/</link>
   <dc:creator>SHARP</dc:creator>
   <description>Recommended Channels from Sharp</description>

<channels>
     <count>2</count>
   </channels>

<dc:relation>net.ind</dc:relation>

</channelset>
<channel>
 ...
</channel>
</csd>
```

FIG. 15 (b)

net_reco.csd

```
<csd>
 <channelset>
   <title> Recommend Channels</title>
   <link>http://www.sharp.co.jp/</link>
   <dc:creator>SHARP</dc:creator>
   <description> Recommended Channels from Sharp</description>

<channels>
     <count>2</count>
   </channels>

<priority>2</ priority >

</channelset>
<channel>
 ...
</channel>
</csd>
```

FIG. 24 net_reco.csd

```
<csd>
 <channelset>
    ...
 </channelset>

<channel about=" http://www.sharp.co.jp/">
   <title>Sharp Corp.</title>
   <genre>company</genre>                    ~1801
   <link>http://www.sharp.co.jp/</link>
   <dc:type>NetContentsApp</dc:type>
   <dc:identifier>001</dc:identifier>
   <accesskey>1</accesskey>
   <icon>http://www.sharp.co.jp/image/logo_sharp.gif</icon>
 </channel>

<channel about=" https://aquos.jp/" >
   <title>AQUOS.jp</title>
   <genre>news</genre>                       ~1802
   <link>https://aquos.jp/</link>
   <dc:type>NetContentsApp</dc:type>
   <dc:identifier>002</dc:identifier>
   <accesskey>2</accesskey>
   <icon>http://www.sharp.co.jp/image/logo_sharp.gif</icon>
 </channel>
</csd>
```

FIG. 30 (a)
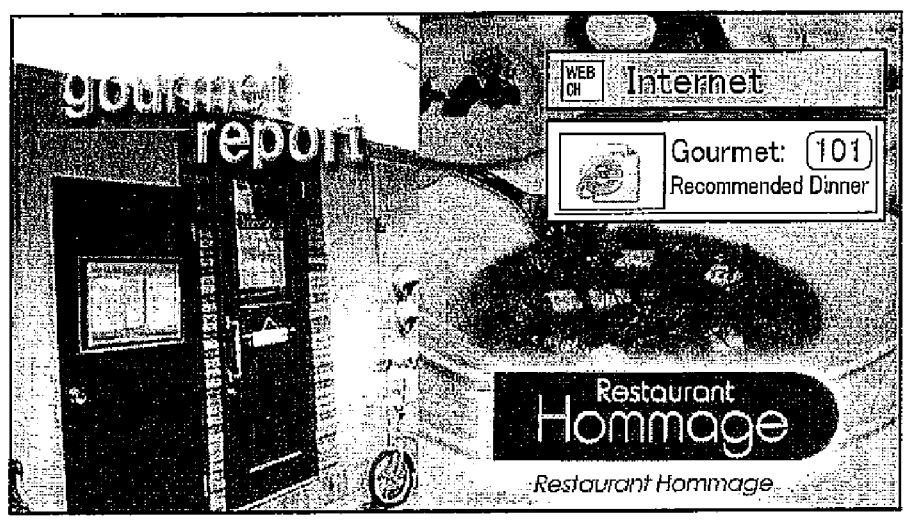
FIG. 30 (b)
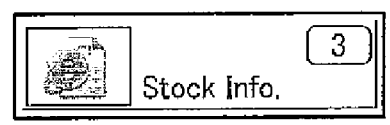
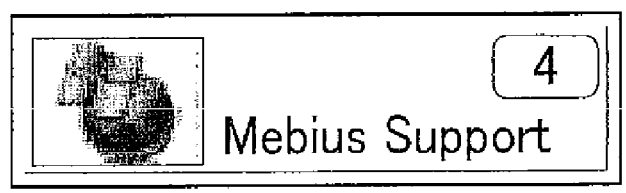
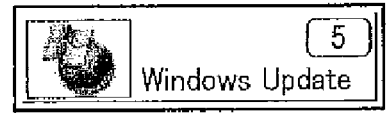

FIG. 33
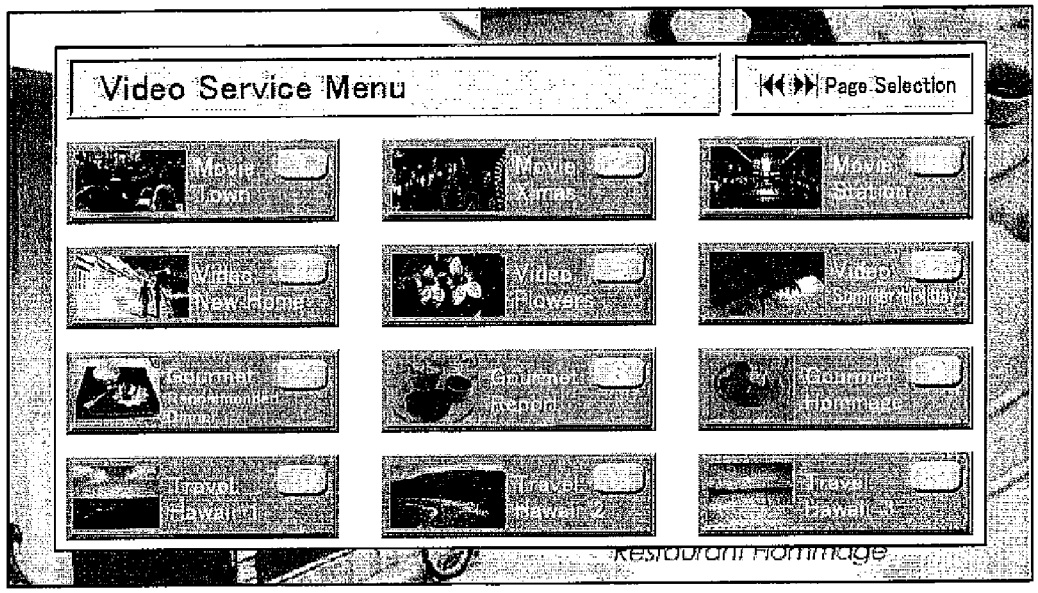
FIG. 34
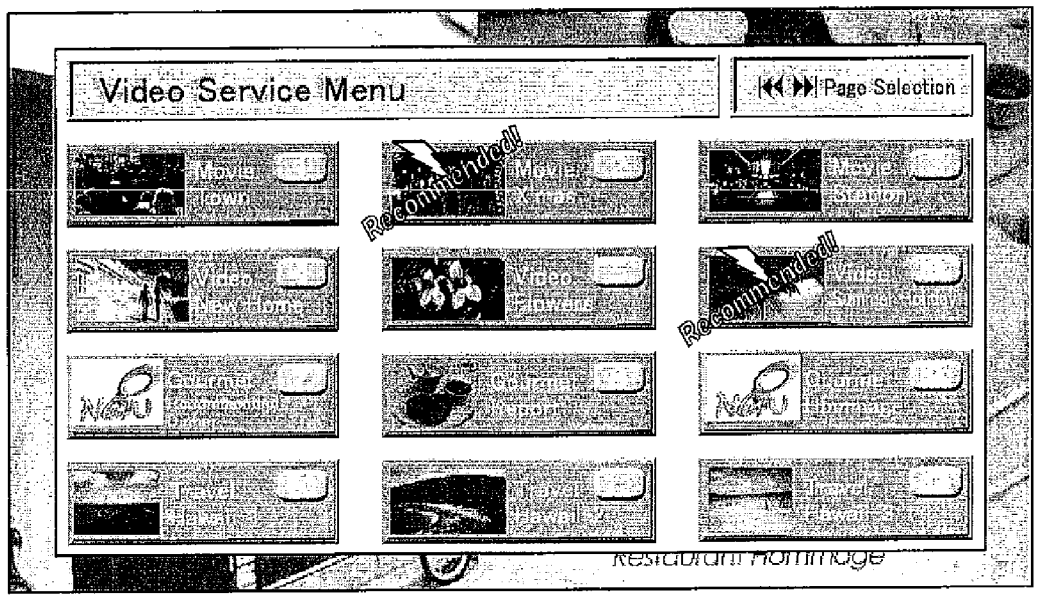
FIG. 35
<a href ="channel://net.ind/net_reco.csd/">To Favorite Channel</a>

RECEIVING DEVICE, SERVER, TELEVISION RECEIVER, MOBILE TERMINAL, SYSTEM, RECEIVING METHOD, INFORMATION PROCESSING PROGRAM, AND STORAGE MEDIUM

TECHNICAL FIELD

The present invention relates to broadcast/information receiving device and information providing devices.

BACKGROUND ART

Personal computers have been the primary devices used to view, for example, over the Internet, movies, still images, and content written in a description language, such as HTML (HyperText Markup Language), SVG (Scalable Vector Graphics), and SMIL (Synchronized Multimedia Integration Language). Viewers can access desired Internet content by, for example, directly inputting a URL (Uniform Resource Locator) or following a link from a portal site or other content.

Recent models of televisions and similar AV devices are also able to give viewers access to content on the Internet (hereinafter, "Net content"). On these devices, the viewer has to similarly follow a link from a portal site or directly input a URL to access Net content.

There is a difference on a television. A program is selected by selecting a channel on a remote controller, whereas Internet content is selected by clicking a link or directly inputting a URL as described above. Therefore, to enable viewing Net content on a television and other AV devices, the remote controller is provided thereon with a dedicated button by which to switch to a Net content viewing mode. After the switching, different manipulation from the viewing of television broadcast is done. The user has to press the dedicated button before he can view Net content. The manipulation is complex.

Patent document 1 discloses technology addressing the complexity of the manipulation. The technology is an LCD television. An EEPROM contains broadcast program selection information and channel selection channel numbers in an associated manner. The tuner section is controlled based on the information and numbers. The EEPROM also contains program information and channel selection channel numbers in an associated manner. A processing program is executed based on the information and numbers. A control section, upon receiving a user input of a selection of a channel selection channel number via a key manipulation section, retrieves from the EEPROM information corresponding to the received channel selection channel number. If the retrieved information is the broadcast program selection information, information. If the detected information is program information, a program is executed according to the program information.

However, with the technology of patent document 1, the viewer manipulates all application programs including broadcast, the Internet, and email using channel selection buttons. For example, when there is much Net content to be displayed, there are so many objects for the user to manipulate with the channel selection buttons that the user cannot readily select target content.

In the television of patent document 1, application programs executed upon channel selection are switched. It may take time to start up application programs for the switching. Therefore, it takes different amounts of time after a channel selection manipulation to display content from an ordinary, broadcast channel selection. In addition, a different application program may be set to run for each channel; it takes various amounts of time depending on selected channels to display content after a channel selection. Furthermore, the startup operation of an application cannot be discontinued halfway after a channel selection.

Channel settings have problems too. In the television of patent document 1, settings are made for each function of the television upon the very first switch of the television. Users cannot access any functions at all until the settings are all made. The channel list settings must be recorded in the television and need to be made by the user. The user is inevitably required to perform very large amounts of setup jobs before he can use the television receiver.

In addition, no method is provided whereby the user can change the arrangement of channels at his/her will. A method is provided for the addition of a new channel; the user has only to manually add a channel. A large workload is required when the user adds a channel.

Still relating to the television of patent document 1, the manipulation method for a channel list display function is vastly different from the manipulation for a channel selection. The user cannot manipulate the channel list display function using channel selection buttons. There is lack of consistency in manipulation methods.

Differences Between Technology of Patent Document 1 and Technology of Present Application The following will list differences between the technology of patent document 1 and the technology of the present application.

The present application handles channel association (numbering system) in the units of channel sets and can have plurality of numbering systems. Patent document 1 can have only one numbering system that is the same system as television channels.

As to the channel list setup method, the present application allows an existing channel list to be updated by obtaining a list from a server. Patent document 1 forces the user to set up a list.

As to the display of information on a selected channel, the present application can display including information on previous and next content of selected content. Patent document 1 only displays information on selected content as part of content.

The present application displays a channel list in association with input buttons on a remote controller. In patent document 1, channel lists are laid as many as channels for selection using a cursor.

The technology of patent document 1 differs from the technology of the present application in other regards too: ex. methods of information display, such as channel calling, and the list display of channel menus.

Patent Document 1: Japanese Unexamined Patent Publication (Tokukai) No. 2002-44536 (published Feb. 8, 2002)

DISCLOSURE OF INVENTION

The present invention, conceived to address these problems, has an objective of realizing a receiving device which enables the user to readily select content even if there is an increased amount of content being assigned to each channel, offers an intuitive channel manipulation method throughout the selecting of a broadcast channel and Net content, and enables the user to readily perform a channel setup manipulation.

Handling of Channels as Channel Sets

The receiving device in accordance with the present invention, to solve the problems, is characterized in that it is a receiving device for, in response to a user selecting one of channels each assigned to either broadcast or information, receiving either broadcast or information corresponding to the selected channel to present either the broadcast or information to the user, the device including: memory means for containing channel set descriptions which are management data for managing classified channels as channel sets and managing the channels in the channel sets; and channel set managing means for obtaining the channel set descriptions from the memory means for execution, in order to switch between the channel sets.

In the configuration, the channel set managing means retrieves a suitable one of channel group descriptions contained in the memory means. The channel set managing means then executes the retrieved channel group description. That enables the receiving device to handle multiple channels corresponding to broadcast and content on the Internet or another network by classifying the channels into channel sets which are preset handling units according to certain rules.

According to the configuration above, Net content channels, in addition to broadcast channels, are classified into units of channel sets for handling. The user first selects a desired channel set to narrow channels down to those contained in the selected channel set. Next, the user selects a desired channel from the reduced number of channels. The user can readily handle large numbers of channels when compared with cases where increasing channels are all handled equally without being grouped. In addition, the user can select desired content by manipulation that is as easy as selecting television broadcast and a television channel.

The channel set descriptions may be recorded on the memory means as non-rewriteable data during the manufacture of the receiving device or upon shipping. Alternatively, the channel set descriptions may be recorded in the memory means as rewriteable data based on new channel group descriptions obtained from outside the receiving device.

(2) Adding Input Means

The receiving device in accordance with the present invention is characterized in that in addition to the configuration, it further includes input means for receiving a select command for one of the channel sets from the user, wherein the channel set managing means switches between the channel sets according to the select command received by the input means.

In the configuration, the input means receives a channel set switch command from the user. The channel set managing means interprets the contents of the received command and retrieves a suitable one of the channel group descriptions from the memory means.

According to the configuration above, the input means receives a select command from the user; the user can select a desired channel set.

(3) Starting Application Program according to Channel

The receiving device in accordance with the present invention is characterized in that in addition to the configuration, it further includes application program control means for storing multiple application programs associated with the channels, switching between the application programs for execution according to channel switching, and starting up one of the application programs according to the selected channel.

In the configuration, as mentioned earlier, the channel set managing means obtains one of the channel set descriptions from the memory means according to a user command for execution, in order to switch between the channels. Meanwhile, the application program control means starts up one of the application programs according to the requested channel (ex. a browser for Internet browsing and a mailer for emailing).

According to the configuration above, channels are switched, and an application program corresponding to the new channel is executed, according to the user command. The user can view the content of the new channel without having to know which application program is needed for the new channel.

(4) Starting Application Program according to Channel Set

The receiving device in accordance with the present invention is characterized in that in addition to the configuration, it further includes application program control means for storing application programs associated with the channel sets, switching between the application programs for execution according to channel set switching, and starting up one of the application programs according to a selected channel set.

In the configuration, as mentioned earlier, the channel set managing means obtains one of the channel group descriptions from the memory means according to a user command for execution, in order to switching between the channel sets. Meanwhile, the application program control means starts up one of the application programs according to the requested channel set (ex. a browser for Internet browsing and a mailer for emailing).

According to the configuration above, channel sets are switched, and an application program corresponding to the new channel set is executed, according to the user command. The user can view the content of the new channel set without having to know which application program is needed for the new channel set.

(5) Confirming before Starting Application Program

The receiving device in accordance with the present invention is characterized in that in addition to the configuration, it further includes application program attribute managing means for managing an attribute of the application programs and asking the user, before starting the application program, for a confirmation as to whether or not to start up the application program according to the attribute.

In the configuration, the application program control means checks the attribute of a new application program managed by the application program attribute managing means before that application program is started in accordance with channel set switching by the user. Then, the application program attribute managing means asks the user for a confirmation as to whether or not to start up the application program according to the attribute checked.

The attribute information may be, for example, the time it takes to start up the individual application program, the size and type of the application program (ex. image viewer, communications application program, etc.), the communication and image-handling capability of the application program.

According to the configuration above, before an application program is actually started according to the attribute information, the user is asked, for example, whether he really wants to launch the program despite that the program takes time to do so. The user can therefore send a command to launch or not to launch the application program at his own will in response to the enquiry. The user can smoothly switch between the channel sets.

If the attribute information is the startup times of the application programs, the application program attribute managing means may inform the user specifically of an estimated startup time.

(6) Description of Related Channel

The receiving device in accordance with the present invention is characterized in that in addition to the configuration, the channel set descriptions contain therein an identifier for a related channel for each of the channels.

In the configuration, the channel managing means is capable of interpreting an identifier for a channel related to the currently selected channel in the channel set descriptions and switches to the related channel.

According to the configuration above, the channel set descriptions contain therein an identifier for a channel related to the channel being selected. The user can thus readily switch to a channel related to the channel he is currently viewing.

(7) Input Button for Switching to Related Channel

The receiving device in accordance with the present invention is characterized in that in addition to the configuration, it further includes an input button for use in switching to the related channel.

In the configuration, the input button for switching to a channel related to the currently viewed channel receives a user command to switch to a channel related to the currently viewed channel and relays the command to the channel managing means. Based on the incoming command, the channel managing means switches the display channel to a related channel embedded in the channel set description.

According to the configuration above, the provision of the button dedicated for the switching to a related channel facilitates the switching to the channel, related to the channel being selected, which is embedded in the channel set description.

(8) Description in Second Channel Set Description of Reference to Channel Set Description The receiving device in accordance with the present invention is characterized in that in addition to the configuration, the channel set descriptions contain therein a name of a second channel set description listing lists of multiple channels for each of the channels; and the second channel set description contains therein an identifier for one of the channel set descriptions that references the second channel set description.

In the configuration, since the channel set descriptions contain therein a name of a second channel set description for each of the channels, the receiving device in accordance with the present invention can switch to the channel set contained in the channel set description. After the switching, upon receiving a return command to switch back to the original channel set from the user, the receiving device in accordance with the present invention switches back to the original channel set based on the information, given in the second channel set description, on the original channel set description referencing the second channel set description.

According to the configuration above, the second channel set description contains information on the original channel set description referencing the second channel set description. Hence, upon receiving a command from the user to switch back to the old channel set, the receiving device can switch back to the original channel set.

(9) Notifying Switching to Second Channel Set

The receiving device in accordance with the present invention is characterized in that in addition to the configuration, it further includes channel managing means for obtaining the channel set descriptions from the memory means according to an incoming channel select command for execution to switch between the channels, wherein when the second channel set description is selected as a channel, the channel managing means instructs the channel set managing means to switch to the channel set selected.

In the configuration, when a channel for which a second channel set description is given is selected by the user, the channel managing means instructs the channel set managing means to switch to a channel set corresponding to the second channel set description. According to the instruction, the channel set managing means switches to the channel set corresponding to the second channel set description.

According to the configuration above, when a channel for which a second channel set description is given is selected by the user, the channel set managing means switches between channel sets according to an instruction. Hence, the user have only to send a command to switch between channels to switch between channel sets.

(10) Channel Switching Button in Second Channel Set

The receiving device in accordance with the present invention is characterized in that in addition to the configuration, it further includes an input button for use in switching between channels in the second channel set.

In the configuration, a channel switch command from the user is received by an input button for use in switching between channels in the second channel set. The received command is relayed to the channel managing means.

According to the configuration above, the input button receives a command to switch between channels in the second channel set. Hence, the user can readily switch between channels in the second channel set.

(11) Button for Moving to Second Channel Set

The receiving device in accordance with the present invention is characterized in that in addition to the configuration, it further includes an input button for use in moving to the second channel set.

In the configuration, a command to move to a channel set from the user is received by an input button for use in moving to the second channel set. The received command is relayed to the channel managing means.

According to the configuration above, the input button receives a command to move to the second channel set. Hence, the user can readily move to the second channel set.

(12) Channel Set Selection Rewind Button

The receiving device in accordance with the present invention is characterized in that in addition to the configuration, it further includes an input button for rewinding a channel set selection from the second channel set to a channel set defined in the original one of the channel set descriptions that references the second channel set.

In the configuration, a channel set selection rewind return command from the user is received using the input button. The command is relayed to the channel set managing means. The channel set managing means rewinds channel set selection from the second channel set to the channel set defined in the original one of the channel set descriptions that references the second channel set.

According to the configuration above, the provision of the channel set selection rewinding button enables the user to readily returning from the second channel set to the original channel set referencing the second channel set.

(13) Changing Display Methods for Second Channel Set

The receiving device in accordance with the present invention is characterized in that in addition to the configuration, it display methods are changed for display of a channel set and for display of a second channel set.

According to the configuration above, the display method for a channel set differs from the display method for a second channel set. The user can hence readily distinguish on screen between a channel set and a second channel set.

(14) Obtaining Channel Set Descriptions from Storage Medium

The receiving device in accordance with the present invention is characterized in that in addition to the configuration, it further includes reading means for retrieving one of the channel set descriptions from a storage medium, wherein the channel set managing means obtains one of the channel set descriptions contained in the storage medium via the reading means.

In the configuration, the channel set managing means obtains one of the channel set descriptions from an external storage medium via the reading means.

According to the configuration above, the receiving device can obtain a channel set description also from an external storage medium, providing another method of obtaining channel set descriptions.

(15) Downloading Channel Set Description from Server

The receiving device in accordance with the present invention is characterized in that in addition to the configuration, it further includes communications means, wherein the channel set managing means obtains channel set descriptions from a server on a network via the communications means.

In the configuration, the channel set managing means obtains channel set descriptions from a server on a network via communications means.

According to the configuration above, the receiving device can obtain various channel set descriptions from an external server. The receiving device therefore enables the user to select a channel set using the various channel set descriptions and view various channels.

(16) Description of Channel Set Source

The receiving device in accordance with the present invention is characterized in that in addition to the configuration, the channel set descriptions contain therein a location from which channel set descriptions are newly obtained; and the channel set managing means updates the channel set descriptions via the communications means based on the description of the location.

In the configuration, the channel set managing means newly obtains channel set descriptions from a server on a network via communications means by using the information on the location contained in the channel set descriptions, the channel sets being obtained from the location. "Newly obtaining" may refer to obtaining for the purpose of checking whether or not the contents of the channel set descriptions already obtained have been updated or to obtaining utterly new channel set descriptions related to the channel set descriptions already obtained.

According to the configuration above, the channel set managing means can obtain channel set descriptions from outside the receiving device. New channel set descriptions with updated contents can always be obtained.

(17) Description of Time Interval at Which Channel Sets are Obtained

The receiving device in accordance with the present invention is characterized in that in addition to the configuration, the channel set descriptions contain therein either a time interval or a time at which channel set descriptions are obtained.

In the configuration, by using information on a time interval, contained in the channel set descriptions, at which channel set descriptions are obtained, the channel managing means obtains channel set descriptions from a server on a network via communications means at the specified time interval.

According to the configuration above, the channel managing means is capable of interpreting the description of a time interval at which a description in the channel set descriptions are updated for execution. The channel managing means obtains new channel set descriptions prepared in a server on a network at regular intervals. Hence, it is ensured that the user can utilize new channel sets.

(18)

The receiving device in accordance with the present invention is characterized in that in addition to the configuration, the channel set descriptions contain a description of a method of obtaining channel set descriptions for each version of the channel set descriptions.

According to the configuration above, the channel managing means change methods of obtaining channel set descriptions for each version of the channel set descriptions. The channel set descriptions are obtained by methods suited to individual versions.

(19) Classifying Channel Sets into Channel Groups

The receiving device in accordance with the present invention is characterized in that in addition to the configuration, the multiple channel sets are managed as channel groups.

In the configuration, the receiving device handles the multiple channels sets classified into channel groups which are preset handling units according to certain rules.

According to the configuration above, the user first selects a channel group to narrow channels down to those contained in the channel group. Next, the user selects a channel set to further narrow channels down to those contained in the channel set. The user can readily handle large numbers of channels because the user has only to select a desired channel from the reduced number of channels.

A description of a channel group may be said to be "contained" not only when a description of a channel group is embedded in a channel group description, but also when the files, each containing a channel group description, have the same names as those of the channel groups into which the channel group descriptions are classified.

(20) Providing Channel Group Button

The receiving device in accordance with the present invention is characterized in that in addition to the configuration, it further includes an input button corresponding to the channel groups.

In the configuration, when an input button corresponding to a predetermined channel group is pressed, the channel group corresponding to the button becomes selected.

According to the configuration above, the user has only to press an input button corresponding to a predetermined channel group to select a desired channel group. The user is required a fewer actions in specifying a channel group than when there is not provided an input button corresponding to a predetermined channel group.

(21) Specifying Channel Group by User

The receiving device in accordance with the present invention is characterized in that in addition to the configuration, it further includes communications means for receiving a channel set description from a server delivering channel set descriptions; and channel group managing means for asking the user as which one of the channel groups the new channel set description obtained via the communications means is to be managed.

In the configuration, the channel group managing means asks the user as which one of the categories the channel group description obtained from a server on a network via communications means is managed. The channel group managing means then manages the obtained channel group description in the specified channel group according to an user input.

According to the configuration above, before adding a channel group description obtained from a server on a network to one of the channel groups, the user is asked to which channel group it should be added. The obtained channel group description is never managed in a channel group to which the user cannot agree. The channel set is contained in a channel group of the user's choice.

(22) Description of Channel Groups to be Added

The receiving device in accordance with the present invention is characterized in that in addition to the configuration, it further includes communications means for receiving a channel set description from a server delivering channel set descriptions; and channel group managing means for, when a channel set description containing therein a description specifying one of the channel groups into which the channel set description should be classified is newly obtained via the communications means, grouping the channel set description to the specified channel group.

In the configuration, by using information, contained in a channel group description obtained from a server on a network via communications means, which specifies a channel group to which the channel group description should be added, the channel group managing means determines the channel group to which the channel group description should be added. The channel group managing means adds the obtained channel group description to the specified channel group.

According to the configuration above, the channel group description obtained from a server on a network is automatically added to a specified channel group according to a specification of a channel group contained in the channel group description. Hence, the user is required a fewer actions in specifying a channel group to which an obtained channel set is to be contained.

(23) Sorting of Channel Sets by Display Priority

The receiving device in accordance with the present invention is characterized in that in addition to the configuration, it further includes channel set sorting means for rearranging a display sequence of channel sets, wherein: a new channel set description obtained via the communications means contains therein a description of display priority for the channel sets; and the channel set sorting means rearranges the channel sets by taking contents described in the display priority into account.

In the configuration, the channel set sorting means is capable of interpreting a channel set description newly obtained from a server via the communications means to rearrange the channel sets by taking into account the description, contained in the channel set description, of the display priority for the channel sets.

According to the configuration above, the channel set description delivered from the server to the receiving device contains a description of priority related with the display sequence of channel sets. The receiving device can change the display sequence of channel sets in response to a channel set rearrange command from the server.

(24) Rearranging Channels by Channel Sorting Means

The receiving device in accordance with the present invention is characterized in that in addition to the configuration, it further includes channel sorting means for rearranging a display sequence of channels, wherein the channel set managing means rearranges the display sequence of channels in a channel set using the channel sorting means.

According to the configuration above, channels are rearranged. The channels are presented to the user in a suitable sequence.

(25) Rearranging Channels by Date of Updating

The receiving device in accordance with the present invention is characterized in that in addition to the configuration, the channel sorting means rearranges the display sequence of channels by date of updating contained in the channel set description.

According to the configuration above, the display sequence of channels is rearranged by the date of updating. The channels are presented to the user in the sequence of updating.

(26) Rearranging Channels by Number of Accesses

The receiving device in accordance with the present invention is characterized in that in addition to the configuration, it further includes communications means for obtaining a number of accesses for each channel, wherein the channel sorting means rearranges the display sequence of channels by the number of accesses.

According to the configuration above, the display sequence of channels is rearranged by the number of accesses to the channels. Hence, the channels are presented to the user in descending order of the number of accesses.

(27) Rearranging Channel Sets

The receiving device in accordance with the present invention is characterized in that in addition to the configuration, it further includes channel set sorting means for rearranging the display sequence of channel sets, wherein the channel group managing means rearranges a display sequence of channel sets in one of the channel groups by the channel set sorting means.

In the configuration, the channel group managing means instructs the channel set sorting means to rearrange the display sequence of channel sets. The channel set sorting means retrieves a channel set description and rearranges the descriptions of the channels contained in the channel set description.

According to the configuration above, channel set descriptions are rearranged. Hence, the channel sets are presented to the user in a suitable sequence.

By allowing the user to specify the sequence of the channels upon the rearrangement, the channel selection sequence can be set up freely as desired by the user.

(28) Rearranging Channel Sets by Date of Updating

The receiving device in accordance with the present invention is characterized in that in addition to the configuration, the channel set sorting means rearranges the display sequence of channel sets by date of updating contained in a channel group description.

According to the configuration above, the display sequence of channel sets is rearranged by date of updating. Hence, the channel sets are presented to the user in the sequence of updating.

(29) Rearranging Channel Sets by Number of Accesses

The receiving device in accordance with the present invention is characterized in that in addition to the configuration, it further includes communications means for obtaining a number of accesses for each channel set, wherein the channel set sorting means rearranges the display sequence of channel sets by the number of accesses.

According to the configuration above, the display sequence of the channel sets is rearranged by the number of accesses to the channel sets. Hence, the channel sets are presented to the user in descending order of the number of accesses.

(30) Generating Channel Set Descriptions from Local File

The receiving device in accordance with the present invention is characterized in that in addition to the configuration, it further includes channel set description generating means for generating a channel set description which is a list of channels in a channel set from a list of URLs stored in the receiving device.

In the configuration, the channel set description generating means extracts URLs from a file, stored in a local folder in the receiving device, which contains a list of URL. The channel set description generating means then embeds the extracted URLs in a template for channel set descriptions to generate new channel set descriptions.

According to the configuration above, in addition to the channel set descriptions prepared in advance in the receiving device and those provided by the server, the receiving device is by itself capable of generating new channel set descriptions from a list of URLs contained in a local file. Various channels are hence provided to the user.

(31) Generating Channel Set Descriptions from Internet Favorites Folder

The receiving device in accordance with the present invention is characterized in that in addition to the configuration, it further includes channel set description generating means for generating a channel set description which is a list of channels in a channel set from a collection of files containing URLs stored in the receiving device.

In the configuration, the channel set description generating means extracts URLs from a collection of files, stored in a local folder in the receiving device, which contains URLs. The channel set description generating means then embeds the extracted URLs in a template for channel set descriptions to generate new channel set descriptions.

According to the configuration above, in addition to the channel set descriptions prepared in advance in the receiving device and those provided by the server, the receiving device is by itself capable of generating new channel set descriptions from a collection of files containing URLs stored in the local folder. Various channels are hence provided to the user.

(32) Generating Channel Set Descriptions from Local File

The receiving device in accordance with the present invention is characterized in that in addition to the configuration, it further includes channel set description generating means for generating a channel set description which is a list of channels in a channel set from a file containing a collection of URL links written in XML, HTML, SVG, RSS, CSV, or plain text, the file being stored in the receiving device.

In the configuration, the channel set description generating means extracts URLs from a file containing a collection of URL links written in XML, HTML, SVG, RSS, CSV, or plain text. The file is stored in a local folder in the receiving device. The channel set description generating means then embeds the extracted URLs in a template for channel set descriptions to generate new channel set descriptions.

According to the configuration above, in addition to the channel set descriptions prepared in advance in the receiving device and those provided by the server, the receiving device is by itself capable of generating new channel set descriptions from a file containing a collection of URL links written in XML, HTML, SVG, RSS, CSV, or plain text. The file is stored in a local folder. Various channels are hence provided to the user.

(33) Generating Channel Set Descriptions from File Received from Server

The receiving device in accordance with the present invention is characterized in that in addition to the configuration, it further includes channel set description generating means for generating a channel set description which is a list of channels in a channel set from a file containing a collection of URL links written in XML, HTML, SVG, RSS, CSV, or plain text, the file being received from a service server.

In the configuration, the channel set description generating means extracts URLs from a file containing a collection of URL links written in XML, HTML, SVG, RSS, CSV, or plain text. The file is received from a service server. The channel set description generating means then embeds the extracted URLs in a template for channel set descriptions to generate new channel set descriptions.

According to the configuration above, in addition to the channel set descriptions prepared in advance in the receiving device and those provided by the server, the receiving device is by itself capable of generating new channel set descriptions from a file containing a collection of URL links written in XML, HTML, SVG, RSS, CSV, or plain text. The file is received from a service server. Various channels are hence provided to the user.

(34) Generating Channel Set Descriptions from Second List of URLs

The receiving device in accordance with the present invention is characterized in that in addition to the configuration, it further includes second URL list managing means for obtaining a second list of URLs, wherein the channel set description generating means generates the channel set descriptions from the file containing a collection of URL links and the second list of URLs obtained separately from the file.

In the configuration, the second URL list managing means obtains a second list of URLs. The channel set description generating means extracts URLs from a file containing a collection of URL links. The channel set description generating means then embeds the extracted URLs and the second list of URLs in a template for channel set descriptions to generate new channel set descriptions.

According to the configuration above, in addition to the channel set descriptions prepared in advance in the receiving device and those provided by the server, the receiving device is by itself capable of generating new channel set descriptions from a file containing a collection of URL links and a second list of URLs. Various channels are hence provided to the user.

(35) Changing and Replacing Channel Set Description According to Attribute Information The receiving device in accordance with the present invention is characterized in that in addition to the configuration, it further includes attribute managing means for storing user attribute information and receiving device attribute information, wherein the channel set managing means compares either the user attribute information or the receiving device attribute information stored in the attribute managing means to the channel set descriptions and changes channel sets presented to the user.

In the configuration, the attribute managing means stores attribute information on viewing of the broadcast or information by individual users of the receiving device or attribute information on the receiving device itself refers to attribute information which is common to all the users of the receiving device, or in other words, attribute information equally applicable to all the users on viewing of the broadcast or information. The attribute information here is inclusive of information on which user has already purchased and thus is allowed to view which pay channel.

The channel set managing means compares this attribute information stored in the attribute managing means to the information contained in the channel set descriptions and edits the channel set descriptions according to results of the comparison. In other words, the channel set managing means changes and/or replaces the channel set descriptions by, for example, deleting the description of channels that do not match the attribute information from the channel set descriptions, to change the channels presented to the user.

According to the configuration above, the channel set managing means is capable of determining which channels are suitable or not suitable for viewing for each user who views broadcast and Net content on the receiving device or globally across all the users, that is, for the receiving device. Suitable channels are hence provided for each user or globally across all the users.

(36) Changing and Replacing Channel Set Descriptions According to Attribute Information The receiving device in accordance with the present invention is characterized in that in addition to the configuration, it further includes: channel managing means for obtaining the channel set descriptions from the memory means according to an incoming channel select command for execution to switch between the channels; and attribute managing means for storing the user attribute information and the receiving device attribute information, wherein the channel managing means compares either the user attribute information or the receiving device attribute information stored in the attribute managing means to the channel set description and changes channels presented to the user.

In the configuration, the attribute managing means stores attribute information on viewing of the broadcast or information by individual users of the receiving device or attribute information on the receiving device itself. The attribute information on the receiving device itself refers to attribute information which is common to all the users of the receiving device, or in other words, attribute information equally applicable to all the users on viewing of the broadcast or information. The attribute information here is inclusive of information on which user has already purchased and thus is allowed to view which pay channel.

The channel managing means compares this attribute information stored in the attribute managing means to the information contained in the channel set descriptions and edits the channel set descriptions according to results of the comparison. In other words, the channel managing means changes and/or replaces the channel set descriptions by, for example, deleting the description of channels that do not match the attribute information from the channel set descriptions, to change the channels presented to the user.

According to the configuration above, the channel managing means is capable of determining which channels are suitable or not suitable for viewing for each user who views broadcast and Net content on the receiving device or globally across all the users, that is, for the receiving device. Suitable channels are hence provided for each user or globally across all the users.

(37) Transmitting User Attribute Information to Server

The receiving device in accordance with the present invention is characterized in that in addition to the configuration, the receiving device transmits the user attribute information to a server prior to obtaining the channel set descriptions from the server.

In the configuration, the receiving device in accordance with the present invention first transmits the user attribute information to a server. The server provides the channel set descriptions according to the user attribute information transmitted. Then, the receiving device in accordance with the present invention obtains the channel set descriptions provided according to the user attribute information by downloading from the server.

According to the configuration above, the channel set descriptions provided by the server are changed according to the user attribute information. Various channel sets are thence provided from the server according to individual users.

(38) Comparing Attribute Information to Genres for Channel Sets

The receiving device in accordance with the present invention is characterized in that in addition to the configuration, the channel set managing means compares either the user attribute information or the receiving device attribute information stored in the attribute managing means to genre information indicating to which genre contents of the channel set belong, the genre information being contained in the channel set descriptions, and changes the channel sets to be provided to the user according to a result of the comparison.

In the configuration, the attribute managing means stores attribute information on viewing of the broadcast or information by individual users of the receiving device or attribute information on the receiving device itself. The attribute information on the receiving device itself refers to attribute information which is common to all the users of the receiving device, or in other words, attribute information equally applicable to all the users on viewing of the broadcast or information. The attribute information here is inclusive of information on which user likes content in which genre.

The channel set managing means compares this attribute information stored in the attribute managing means to the genre information contained in the channel set descriptions and determines whether or not to present channels in a particular genre to the user, in order to change the channel sets presented to the user.

According to the configuration above, the channel set managing means is capable of determining the content in which genre is to be presented for each user who views broadcast and Net content on the receiving device or globally across all the users, that is, for the receiving device. Channels in favorite genres are hence provided for each user.

(39) Displaying Purchase Confirmation Screen

The receiving device in accordance with the present invention is characterized in that in addition to the configuration, the channel set managing means, if having determined that a channel set is a pay channel as a result of the comparison of either the user attribute information or the receiving device attribute information to the genre information contained in the channel set description, displays a screen in which the user is asked to confirm whether or not the user is willing to purchase the channel set.

According to the configuration above, the channel set managing means is capable of determining whether or not the channel set which the user is going to view is a pay channel. The channel set managing means can confirm whether or not the user is willing to view the pay channel set.

(40) Comparing Attribute Information to Channel Genre

The receiving device in accordance with the present invention is characterized in that in addition to the configuration, the channel managing means compares either the user attribute information or the receiving device attribute information stored in the attribute managing means to genre information indicating to which genre contents of the channel belong, the genre information being contained in the channel set descriptions, and changes the channels to be provided to the user according to a result of the comparison.

In the configuration, the attribute managing means stores attribute information on viewing of the broadcast or information by individual users of the receiving device or attribute information on the receiving device itself. The attribute information on the receiving device itself refers to attribute information which is common to all the users of the receiving device, or in other words, attribute information equally applicable to all the users on viewing of the broadcast or information. The attribute information here is inclusive of information on which user likes content in which genre.

The channel managing means compares this attribute information stored in the attribute managing means to the genre information contained in the channel set descriptions and determines whether or not to present channels in a particular genre to the user, in order to change the channel sets presented to the user.

According to the configuration above, the channel managing means is capable of determining the content in which genre is to be presented for each user who views broadcast and Net content on the receiving device or globally across all the users, that is, for the receiving device. Channels in favorite genres are hence provided for each user.

(41) Call Display for Channel Sets and Channels

The receiving device in accordance with the present invention is characterized in that in addition to the configuration, it further includes channel set display means for, during switching between channel sets, presenting information on an old or new channel set to the user; and channel call display means for, during switching between channels, presenting information on an old or new channel to the user.

In the configuration, when the user switches between the channel sets and channels, the channel set display means and the channel call display means present to the user information on the channel set and channel before and after the switching.

According to the configuration above, the user can obtain information on the channel set and channel before and after the switching. Thus, the user can readily switch to the desired channel set and channel based on the information.

(42) Displaying Channel Attribute Information Icon to Channel Call

The receiving device in accordance with the present invention is characterized in that in addition to the configuration, the channel call display means displays, for a channel call, an icon representing channel attribute information contained in the channel set descriptions.

According to the configuration above, an icon is displayed representing channel attribute information. When the user refers to the icon to select a channel, the user is presented with channel features in an easy-to-recognize manner.

(43) Changing Background Design for Channel Call according to Channel Attribute

The receiving device in accordance with the present invention is characterized in that in addition to the configuration, the channel call display means changes a background design for a channel call according to channel attribute information contained in the channel set descriptions.

According to the configuration above, the background design for the channel call can be changed according to the channel attribute information. Hence, when the user refers to the background for the channel call to select a channel, the user is presented with channel features in an easy-to-recognize manner.

(44) Obtaining Channel Attribute Information

The receiving device in accordance with the present invention is characterized in that in addition to the configuration, it further includes channel attribute information obtaining means for obtaining the channel attribute information.

According to the configuration above, the channel attribute information obtaining means obtains the channel attribute information. More icons can be displayed based on the channel attribute information obtained by the channel attribute information obtaining means. Hence, when the user refers to the icons to select a channel, the user is presented with channel features in a more easy-to-recognize manner.

(45) Displaying Content with Delay on Switching Between Channel Set Displays

The receiving device in accordance with the present invention is characterized in that in addition to the configuration, it further includes channel set managing means for actually switching between contents of channel sets only if after information on the channel sets being switched is presented to the user via the channel set display means according to a channel set switch command from the user, either a particular manipulation input is received or no manipulation input is received at all for a particular period of time.

In the configuration, the channel set managing means presents information on the channel sets being switched to the user via the channel set display means according to a channel set switch command from the user. Then, if and only if certain conditions are met (for example, a button is pressed which determines a channel set or no input is made for a particular period of time, after the last switching manipulation), the contents of the channel sets are actually switched.

According to the configuration above, switching between contents of channel sets, which takes more time than switching between displays of channel sets, takes place after a channel set is ultimately determined. Smooth channel set switching is thus realized. Hence, the user is not put under stress during channel set switching.

(46) Displaying Content with Delay on Switching between Channel Call Displays

The receiving device in accordance with the present invention is characterized in that in addition to the configuration, it further includes channel managing means for actually switching between contents of channels only if after information on the channels being switched is presented to the user via the channel call display means according to a channel switch command from the user, either a particular manipulation input is received or no manipulation input is received at all for a particular period of time.

In the configuration, the channel managing means presents information on the channels being switched to the user via the channel call display means according to a channel switch command from the user. Then, if and only if certain conditions are met (for example, a button is pressed which determines a channel or no input is made for a particular period of time, after the last switching manipulation), the contents of the channels are actually switched.

According to the configuration above, switching between contents of channels, which takes more time than switching between channel call displays, takes place after a channel is ultimately determined. Smooth channel switching is thus realized. Hence, the user is not put under stress during channel switching.

(47) Displaying List of Channels

The receiving device in accordance with the present invention is characterized in that in addition to the configuration, it further includes list display menu generating means for generating a list of channels from the channel set descriptions to present the list to the user as a list display menu.

In the configuration, the list display menu generating means receives a command from the user to display a list of channels. The list display menu generating means then obtains a channel set description via the channel set managing means, generates a list display menu, and presents the menu to the user.

According to the configuration above, the user can select a channel while viewing the list display menu for channels. The user can readily select a channel.

(48) Changing List Display Menu Depending on Type

The receiving device in accordance with the present invention is characterized in that in addition to the configuration, the channel set descriptions contain a type of the list display menu; and the list display menu generating means changes a display of the list display menu according to the type.

In the configuration, the list display menu generating means generates the list display menu according to the type of the list display menu contained in a channel set description.

According to the configuration above, by changing the type of the list display menu contained in the channel set descriptions, the list display menu presented to the user can be readily changed.

(49) Obtaining Components of List Display Menu from Outside

The receiving device in accordance with the present invention is characterized in that in addition to the configuration, the receiving device externally obtains components of the list display menu.

According to the configuration above, the list display menu generating means externally obtains components of the list display menu. Hence, the list display menu can be constructed in a flexible manner for display.

(50) Displaying List Display Menu upon selecting Channel Set

The receiving device in accordance with the present invention is characterized in that in addition to the configuration, the channel set descriptions contain a description as to whether or not to display the list display menu upon selecting a channel set; and if there is a description for a display of the list display menu, the list display menu generating means generates the list display menu.

In the configuration, the channel set descriptions contain a description as to whether or not to display a list display menu upon selecting a channel set. If there is contains a description to display a list display menu, the list display menu generating means, upon selecting a channel set, generates a list display menu for display.

According to the configuration above, by the channel set descriptions containing a description as to whether or not to display a list display menu upon selecting a channel set, it can be controlled whether or not to display a list display menu.

(51) Displaying Channel Attribute Information Icon in List Display Menu

The receiving device in accordance with the present invention is characterized in that in addition to the configuration, the list display menu generating means displays, in the list display menu, an icon representing channel attribute information contained in the channel set descriptions.

According to the configuration above, an icon representing the channel attribute information is displayed in the list display menu. Hence, when the user refers to an icon to select a channel, the user is presented with channel features in an easy-to-recognize manner.

(52) Obtaining Channel Attribute Information

The receiving device in accordance with the present invention is characterized in that in addition to the configuration, it further includes channel attribute information obtaining means for obtaining the channel attribute information.

According to the configuration above, more icons can be displayed based also on the channel attribute information obtained by the channel attribute information obtaining means. Hence, when the user refers to the icons to select a channel, the user is presented with channel features in a more easy-to-recognize manner.

(53) Association of List Display and Numeric Buttons

The receiving device in accordance with the present invention is characterized in that in addition to the configuration, the list display menu generating means displays the channels in a three columns by four lines format as a list of channels and assigns the channels to respective numeric buttons arranged in the three columns by four lines format.

In the configuration, the list display menu generating means displays a list of channels in a three columns by four lines format and assigns the channels to respective numeric buttons arranged in the three columns by four lines format so that the positions of the numeric buttons correspond one to one to the channels displayed on the screen of the receiving device.

According to the configuration above, when the user selects a channel from a displayed list of channels, the user has only to press one of the numeric buttons that corresponds to the array of channels displayed in the list, which facilitates user's channel select manipulation. Therefore, the user can select a channel from the displayed list of channels by a similar manipulation to the manipulation performed to select a broadcast channel using the numeric buttons.

(54) Selecting Channel Using Channel Selection Buttons from List Display

The receiving device in accordance with the present invention is characterized in that in addition to the configuration, while the list display menu generating means is displaying the list display menu for channels with one of the channels being displayed as being selected, the list display menu generating means moves the channel selection display according to a press of a forward or backward channel selection button by the user.

In the configuration, while the list display menu generating means is displaying the list display menu for channels with one of the channels being displayed as being selected, the user presses either a forward or backward channel selection button. In response to the press of the forward or backward channel selection button, the selection moves sequentially to a succeeding or preceding channel.

According to the configuration above, the user can select a channel that is being displayed as being selected, in other words, that is to be selected, in the list display by pressing the channel selection buttons. Hence, the user can select a channel without using the numeric buttons.

(55) Changing Channels by Specifying Channel Sets and Channels

The receiving device in accordance with the present invention is characterized in that in addition to the configuration, the list display menu generating means assigns, to each channel icon in the list display menu for channels to be displayed, a name of a channel set to which the channel icon belongs, a number of the channel, and an attribute of the channel as assignment information and when the user has selected the channel from the list display menu, changes the channel based on the assignment information.

In the configuration, when the user has selected a channel from a list display menu, the channel set managing means and the channel managing means receives, from the list display menu generating means, assignment information on which channel has been selected. From the received assignment information, the channel set managing means and the channel managing means know which channel is being selected.

According to the configuration above, the assignment information is communicated to the channel set managing means and the channel managing means. Hence, even if the user presses a forward or backward channel selection button after selecting a channel from a list display menu, the channel subsequent to the channel selected in the list display menu is correctly selected.

For example, suppose that channel 1 is being selected and its content is being displayed. If the content of channel 10 is reproduced from the list display menu, pressing a channel selection button during the reproduction of the content results in a display of the content of channel 11. If the assignment information were not communicated to the channel set managing means and the channel managing means, in this example, pressing a channel selection button during the reproduction of the content of channel 10 results in a display of the content of channel 2.

(56) Server Delivering Channel Set Descriptions

A server in accordance with the present invention is characterized in that it provides at least either one of channel group descriptions and the channel set descriptions to a receiving device over a network via the communications means, the channel group descriptions each being a collection of channel sets as a channel group.

In the configuration, the server provides at least one of channel group descriptions and the channel set descriptions to a receiving device over a network.

According to the configuration above, the server provides at least one of channel group descriptions and the channel set descriptions. Hence, the server can provide services: for example, downloading channels group descriptions and channel set descriptions from another server to set up channels collectively on the receiving device.

(57) Server Providing Channel Set Descriptions according to User Attribute Information Another server in accordance with the present invention is characterized in that it provides the receiving device over a network with a channel set description corresponding to the user attribute information received from the receiving device.

In the configuration, the server first receives user attribute information from the receiving device. The server then selects a channel set description according to the received user attribute information and provides the selected channel set description to the receiving device over a network.

According to the configuration above, the server changes the channel set description to be provided, according to user attribute information. Hence, the server can provide a variety of channel sets suited to individual users.

(58) Server Providing Channel Set Descriptions according to Identity Number of Receiving Device The server in accordance with the present invention is characterized in that in addition to the configuration, the server changes, according to an identity number of the receiving device, the channel set description provided to the receiving device.

In the configuration, the server receives the identity number of the receiving device from the receiving device, changes the channel set description according to the received identity number of the receiving device, and provides the changed channel set description to the receiving device over a network.

According to the configuration above, the server can change the channel set description it provides, according to the identity number of the receiving device. Hence, the server can provide a variety of channel sets suited to individual receiving devices.

(59) Television Receiver Connectable to Internet

A television receiver connectable to the Internet in accordance with the present invention includes a receiving device of in accordance with the present invention.

In the configuration, the television receiver is connectable to the Internet.

According to the configuration above, the television receiver is connectable to the Internet. Hence, the user can both view Internet content and enjoy services provided on the Internet.

(60) Mobile Terminal Connectable to Internet

A mobile terminal connectable to the Internet in accordance with the present invention includes a receiving device in accordance with the present invention.

In the configuration, the mobile terminal is connectable to the Internet.

According to the configuration above, the mobile terminal is connectable to the Internet. Hence, the user can both view Internet content and enjoy services provided on the Internet.

(61) System Composed of Receiving Device and Server

A system in accordance with the present invention includes a receiving device and a server.

In the configuration, the server provides channel set descriptions to the receiving device over a network.

(62) receiving method

Meanwhile, a method of, in response to a user selecting one of channels each assigned to either broadcast or information, receiving either broadcast or information corresponding to the selected channel to present either the broadcast or information to the user in accordance with the present invention, to solve the problems, is characterized in that the method involves: the recording step of recording channel set descriptions which are management data for managing classified channels as channel sets and managing the channels in the channel sets; and the channel set managing step of obtaining the channel set descriptions from the recording step for execution, in order to switch between the channel sets.

In the configuration, the channel set managing step interprets the contents of the received command and retrieves a suitable one of the channel group descriptions recorded in the recording step. The channel set managing step then executes the retrieved channel group description so that the receiving device can handle multiple channels corresponding to incoming broadcast and content on the Internet or another network by classifying the channels into channel sets which are preset handling units according to certain rules.

According to the configuration above, Net content channels, in addition to broadcast channels, are classified into units of channel sets for handling. The user first selects a channel set to narrow channels down to those contained in the selected channel set. Next, the user selects a desired channel from the reduced number of channels. The user can readily handle large numbers of channels when compared with cases where increasing channels are all handled equally without being grouped.

(63) The receiving device may be realized by hardware or by running a computer program on a computer. Specifically, a computer program in accordance with the present invention is an information processing program for causing a computer to operate as at least the channel set managing means, the application program control means, the application program attribute managing means, the channel group managing means, the input means, the channel set display means, the channel call display means, and the list display menu generating means. A storage medium in accordance with the present invention contains the information processing program.

A computer, upon executing the information processing program, operates as the information processing device. Therefore, Net content channels, in addition to broadcast channels, are collectively handled by the units of channel sets as in the receiving device. The user can readily handle large numbers of channels when compared with cases where increasing channels are all handled equally without being grouped.

The receiving device in accordance with the present invention may be a receiving device receiving broadcast and information and is characterized in that the device includes input means, channel managing means, broadcast receive means, screen display means, and channel set managing means, and manages a series of channels as channel sets.

The receiving device in accordance with the present invention may be adapted to be characterized in that the device further includes application program control means and application program execute means, wherein the device switches between channel sets according to an instruction from the input means and switches between inputs and starts up a application program according to the channel set requested in the instruction.

The receiving device in accordance with the present invention may be adapted to be characterized in that the device further includes application program attribute managing means and confirmation display means, wherein prior to the startup of an application program, the device asks a user for a confirmation as to switching according to the attribute of the application program managed by the application program attribute managing means.

The receiving device in accordance with the present invention may be adapted to be characterized in that the device further includes channel set display means and channel call display means, wherein during a selection of a channel set or a channel, the contents being selected or having been selected are displayed.

The receiving device in accordance with the present invention may be adapted to be characterized in that a menu is displayed in a three columns by four lines format with each being assigned with a corresponding numeric button.

The receiving device in accordance with the present invention may be adapted to be characterized in that pressing a channel selection button in a menu display results in a selection of preceding and succeeding items of each item.

The receiving device in accordance with the present invention may be adapted to be characterized in that the channel set descriptions contain for each channel an identifier for related channels.

The receiving device in accordance with the present invention may be adapted to be characterized in that the input means includes input buttons corresponding to transitions to the related channels.

The receiving device in accordance with the present invention may be adapted to be characterized in that the channel set descriptions contain as a description of the channels therein a second channel set description further listing multiple channels and the second channel set description contains an identifier for the channel set description referencing the second channel set description.

The receiving device in accordance with the present invention may be adapted to be characterized in that when the second channel set description is selected as a channel, the channel managing means instructs the channel set managing means to switch to the selected channel set.

The receiving device in accordance with the present invention may be adapted to be characterized in that the input means includes input buttons corresponding to transitions to channels in a second channel set.

The receiving device in accordance with the present invention may be adapted to be characterized in that the input means includes an input button to return from the second channel set to the channel set description referencing the second channel set.

The receiving device in accordance with the present invention may be adapted to be characterized in that the device further includes channel set managing means for actually switching between contents of channel sets via the channel set display means according to a channel set switching command from the user only if either the input means receives a particular manipulation input or no manipulation input at all for a particular period of time after information on the channel sets being switched is presented to the user.

The receiving device in accordance with the present invention may be adapted to be characterized in that the device further includes channel managing means for actually switching contents of channels via the channel call display means according to a channel switch command from the user only if either the input means receives a particular manipulation input or no manipulation input at all for a particular period of time after information on the channels being switched is presented to the user.

The receiving device in accordance with the present invention may be adapted to be characterized in that the device further includes list display menu generate display for generating a list of channels from a list of channel descriptions for presentation to the user.

The receiving device in accordance with the present invention may be adapted to be characterized in that the device transmits user attribute information to the server prior to obtaining a channel set description from the server.

The server in accordance with the present invention may be adapted to be characterized in that the server provides a channel group description corresponding to the user attribute information received via the communications means to the receiving device over a network.

The receiving device in accordance with the present invention is a receiving device for, in response to a user selecting one of channels each assigned to either broadcast or information, receiving either broadcast or information corresponding to the selected channel to present either the broadcast or information to the user and may be adapted to be characterized in that the device include: memory means for containing channel set descriptions which are management data for managing channels as channel sets and managing the channels in the channel sets; input means for receiving a channel set select command from the user; and channel set managing means for causing the channel managing means to obtain a channel set description B corresponding to a channel set B which is a next channel set in the channel group descriptions already retrieved and interpreted from the memory means according to the channel set select command received by the input means and to execute the description B so as to switch from a channel set A to the channel set B.

BRIEF DESCRIPTION OF DRAWINGS

FIG. 4 shows a description example (net.ind) of a channel group definition for use in the receiving device 100 in accordance with embodiment 1 of the present invention.

FIG. 5 shows a description example (net_reco.csd) of a channel set definition for use in the receiving device 100 in accordance with embodiment 1 of the present invention.

FIG. 8(a) shows a description example (net_reco.csd) of a channel set definition specifying previous and next related channels, for use in the receiving device 100 in accordance with embodiment 1 of the present invention.

FIG. 8(b) shows a description example (net_reco.csd) of a channel set definition specifying related channels by listing, for use in the receiving device 100 in accordance with embodiment 1 of the present invention.

FIG. 8(c) shows a description example (net_reco.csd) of a channel set definition specifying another channel set as channels, for use in the receiving device 100 in accordance with embodiment 1 of the present invention.

FIG. 11 shows a description example of a channel set definition including embedded therein a source for a channel set description file, for use in the receiving device 100B in accordance with embodiment 1 of the present invention.

FIG. 13(a) shows a description example of a channel set definition including embedded therein a source and an update interval for an encrypted update file, for use in a receiving device in accordance with embodiment 1 of the present invention.

FIG. 13(b) shows a description example of a channel set definition including embedded therein sources and update intervals for a plurality of update files utilizing different description versions, for use in a receiving device in accordance with embodiment 1 of the present invention.

FIG. 15(a) shows a description example of a channel set definition for automatically adding a downloaded new channel set definition to a specified category in accordance with embodiment 1 of the present invention.

FIG. 15(b) shows a description example of a channel set definition for specifying channel priority in accordance with embodiment 1 of the present invention.

FIG. 24 shows a description example of a channel set definition giving genre information for use in the receiving device 100F in accordance with embodiment 1 of the present invention.

FIG. 30(a) shows a display example of a channel call function used in a channel switching manipulation in accordance with embodiment 2 of the present invention where information on a selected channel is being displayed on a screen after channel switching in response to the user pressing a channel selection button.

FIG. 30(b) shows a display example of a channel call function used in a channel switching manipulation in accordance with embodiment 2 of the present invention where information on the previous and next channels of the currently selected channel is being displayed simultaneously on a screen.

FIG. 33 shows an example of a channel list display menu displayed on a screen of the receiving device 100I in accordance with embodiment 3.

FIG. 34 shows an example of a channel list display menu displayed on a screen of the receiving device 100I together with attribute information and update information of the channels in accordance with embodiment 3.

FIG. 35 shows a description example including embedded therein a channel transition command in content in accordance with embodiment 3 of the present invention.

BEST MODE FOR CARRYING OUT INVENTION

Channels and Channel Sets

In the present invention, a channel is used in a sense that broadly identifies one piece of information. The term may refer not only to a broadcast frequency, but also to a URL pointing at a piece of information content on the Internet, a URL pointing at a local file, an address book for a telephone system, etc. A channel set is a collection of channels complied according to certain rules.

Embodiment 1

Figure 1:
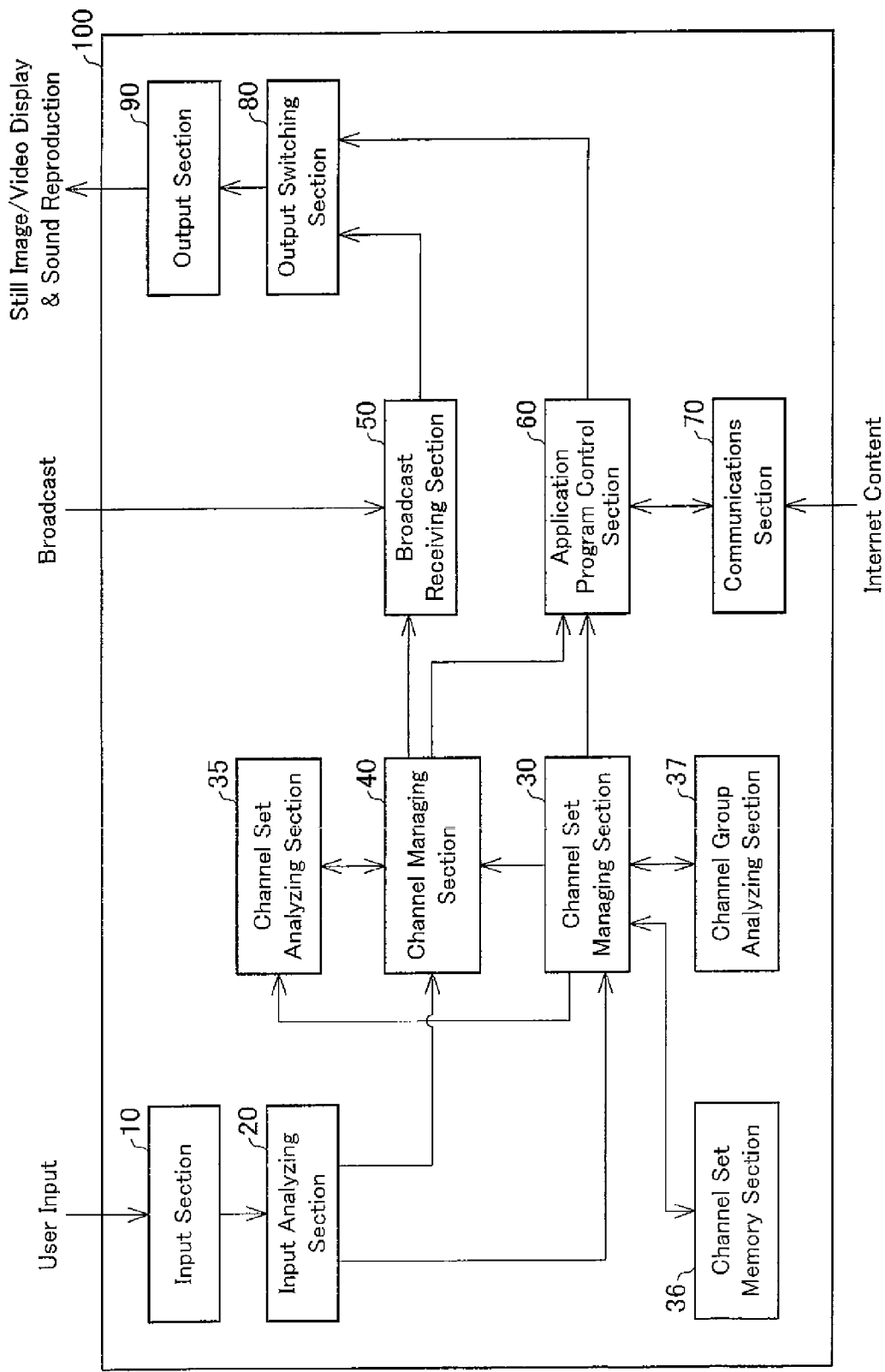
FIG. 1 is a function block diagram of a major part of a receiving device 100 in accordance with embodiment 1 of the present invention.

FIG. 1 is a function block diagram of a major part of a receiving device 100 in accordance with embodiment 1 of the present invention.

An input section (input means) 10 is made up of, for example, buttons on the main body of the receiving device 100 or on a remote controller for the receiving device 100. The input section 10 receives user manipulation (presses of the buttons) as an input. The input section 10 passes the received manipulation input to an input analyzing section 20. The input analyzing section 20 determines whether the manipulation input is related to a channel set, a channel, or anything else. If the manipulation input is related to a channel set, the section 20 passes control to a channel set managing section (channel set managing means) 30. If the manipulation input is related to a channel, the section 20 passes control to a channel managing section (channel managing means) 40. The channel set managing section 30, to which control is now passed, selects a channel set corresponding to the user selection through a channel group analyzing section 37. If channel sets need to be switched, The section 30 retrieves a corresponding channel set description from a channel group description (detailed later) contained in a channel set memory section 36. The section 30 sets up the channel set analyzing section 35 according to the channel set description before passing control to the channel managing section 40. The channel managing section 40, to which control is now passed, retrieves a channel set description (detailed later) and if necessary, switches channels. If the new channel is a broadcast channel, the channel managing section 40 sends an instruction to a broadcast receiving section 50 to receive a corresponding broadcast channel. If the new channel requires use of an application program, the channel managing section 40 instructs an application program control section (application program control means) 60 to execute an application program corresponding to the requested content. The broadcast receiving section 50 receives a broadcast channel according to an instruction from the channel managing section 40 and outputs the content of the received broadcast channel to an output switching section 80. The application program control section 60 executes an application program corresponding to a currently selected channel set and channel according to an instruction from the channel managing section 40. After the startup of an application program, the channel managing section 40 obtains attribute values (detailed later) from the channel set analyzing section 35 and sets up the application program control section 60 accordingly. If the application program executed requires content on the Internet or another network, The section 40 obtains the content from that network through a communications section 70. The section 40 then outputs resultant outputs of the executed application program to the output switching section 80. The communications section (communications means) 70, in response to a request from the application program executed in the application program control section 60, obtains content from a network and passes the content to the application program control section 60. The output switching section 80 switches between the outputs of the broadcast receiving section 50 and the application program control section 60 according to a manipulation input by the user obtained through a path (not shown) and passes to the output section 90. The output section 90 is made up of a screen for video display and speakers for sound reproduction to present the output of the output switching section 80 to users in the form of images and sound.

The example above concerned a configuration for broadcast and Internet content. The same basics apply to applications which handle IP telephony and local files. In the configuration above, it was the channel managing section 40 that made an instruction to the application program control section 60. However, if an application program can be identified for each channel set, another configuration is also possible in which the channel set managing section 30 makes an instruction to start up an application program so that the channel managing section 40 only set attributes.

Example of Remote Controller for Embodiment 1

Figure 2:
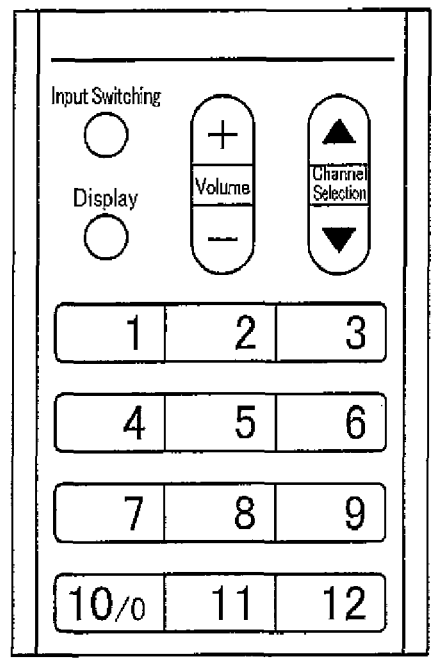
FIG. 2(a) is a drawing of an example of a remote controller provided with an input switching button and channel selection buttons, for use with the receiving device 100 in accordance with embodiment 1 of the present invention.
FIG. 2(b) is a drawing of an example of a remote controller provided with category buttons, for use with the receiving device 100 in accordance with embodiment 1 of the present invention.
Figure 2:
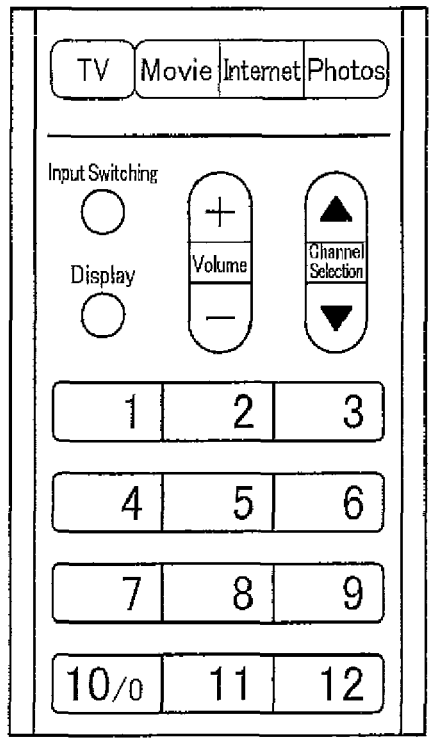

FIGS. 2(a) and 2(b) illustrate examples of remote controllers for use with the receiving device 100 of the present invention. In the example shown in FIG. 2(a), the remote controller has an input switching button and channel selection buttons. The input switching button enables selection of a channel set. The channel selection buttons enable selection of a channel in a specified channel set. The remote controller may have also numeric buttons enabling direct inputs of a desired channel number. The same buttons can also be used to enable selection of a broadcast channel. When that is the case, a button controlling means is selected according to the type of the channel being selected. For example, if the currently selected channel is broadcast, the broadcast receiving section 50 controls the buttons; if it is an application program, the application program control section 60 controls the buttons.

Switching Process for Channels and Channel Sets

Figure 3:
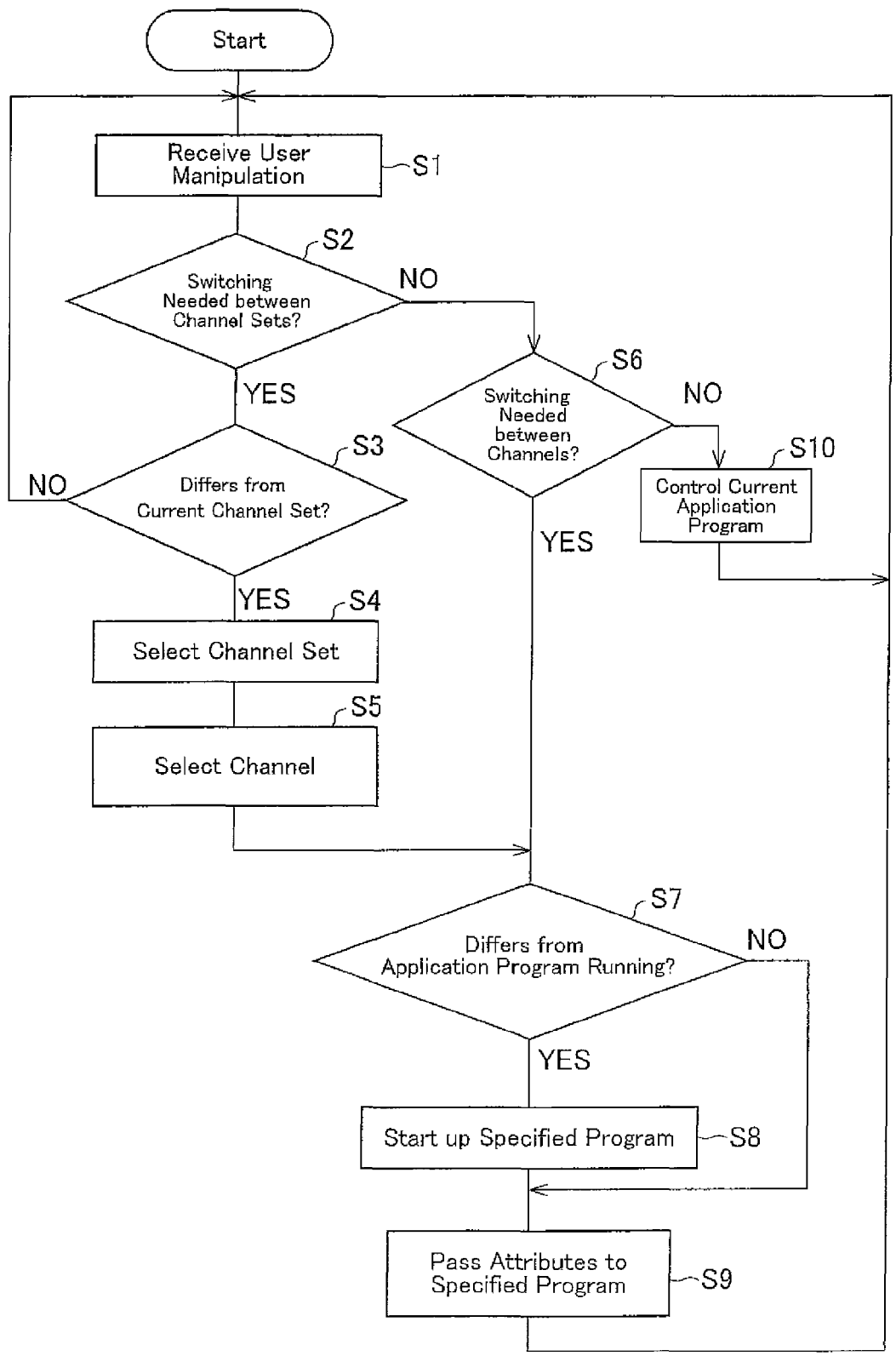
FIG. 3 is a flow chart illustrating a process of switching between channels and channel sets in the receiving device 100 in accordance with embodiment 1 of the present invention.

FIG. 3 is a flow chart illustrating a process of switching between channels and channel sets.

First, the input section 10 receives a user manipulation input (step 1; hereinafter abbreviated "S1"). Next, the input analyzing section 20 determines whether or not the user manipulation input is for a switching between channel sets, that is, whether or not the input switching button has been pressed (S2). If the manipulation input is for a switching between channel sets, the process proceeds to a next step, or S3, and the input analyzing section 20 passes control to the channel set managing section 30. If the manipulation input is not for a switching between channel sets, the process proceeds to a next step, or S6.

If the user manipulation input is for a switching between channel sets, the channel set managing section 30 determines whether or not the currently selected channel set is identical to the channel set fed through the input switching button (S3). If not identical, the process proceeds to S4 where channel sets are switched. If identical, there is no step that has to be performed; the process returns to S1.

If the currently selected channel set is different from the channel set fed through the input switching button, the channel set managing section 30 obtains a channel group description corresponding to the channel set input from the channel set memory section. The section 30 sets up the channel set analyzing section 35 according to the obtained channel group description before passing control to the channel managing section 40 (S4).

Next, the channel managing section 40 selects a channel in the selected channel set (S5). This channel selection is made within a selected channel set. The channel managing section 40 checks which is the channel last viewed in the selected channel set. A channel is selected according to the channel last viewed, the default display channel upon selection specified for each channel set, and other settings. The settings for the channel selection may differ from one receiving device to another or from one channel set to another. After the channel selection, the process proceeds to S7 where it is determined whether or not the application program to be used for the newly selected channel differs from the application program that is currently running.

If the user manipulation input is not for a switching between channel sets, the input analyzing section 20 determines whether or not the user manipulation input is for a switching between channels (S6). If the manipulation input is for a switching between channels, the process proceeds to a next step, or S7, and the input analyzing section 20 passes control to the channel managing section 40. If the manipulation input is not for a switching between channels, the process proceeds to a next step, or S10.

Next, the channel managing section 40 determines an application program by which the selected channel is to be displayed. The section 40 then determines whether or not the determined application program differs from the application program that is currently running (S7). If it does, the process proceeds to a next step, or S8, where the section 40 starts up the application program. If the programs are identical, the process proceeds to a next step, or S9.

If the determined application program differs from the application program that is currently running, the channel managing section 40 requests the application program control section 60 to start up an application program. The application program control section 60 starts up the requested application program (S8).

Next, the channel managing section 40 passes attribute values (detailed later) suitable for the channel being selected to the application program that is currently running or that has newly started up (S9). Thereafter, the process returns to S1.

In S6, if the user manipulation input is not for a switching between channels, since the user manipulation input is neither an instruction for switching between channel sets nor an instruction for switching between channels, no switching takes place. The input analyzing section 20 passes control to the application program control section 60. The application program control section 60 controls the currently running application program (S10). After completing the control of the application program, the process returns to S1.

Description File Used Upon Selection of Channel Set or Channel

Description files used here are shown in FIGS. 4 and 5. FIG. 4 is an description example (net.ind) of a channel group definition. FIG. 5 is an description example (net_reco.csd) of a channel set definition.

A channel group description is a list of channel sets and used in selecting a channel set. The channel group description is managed by the channel set managing section 30.

A channel set description is a definition for each channel set, that is, a list of channels in a channel set and used in selecting a channel. The channel set description is managed by the channel managing section 40.

A channel group description includes embedded therein the names of, and links to, channel set descriptions and may also include icons and other information for the channel set descriptions.

The channel set description lists only those channels which are available upon the selection of the channel set. The description includes for each channel an application program and attribute values for the program. The description may also include icons, associated channel buttons, and other information for the channels.

Each channel set may be associated with an application program for use with that channel set so that the divisions for application programs coincide with the divisions for channel sets. In that case, since all the channels in one channel set utilize the same application program, only the attribute value that is passed to the application program is changed when channels are switched within one channel set. Therefore, quick channel switching is possible.

Application Program and its Attribute Values

For Internet browser applications, the attribute value is a URL. By similarly designing attribute values, various applications, including those working with local files, can be treated as channels. Specifically, use a telephone number, an ID number, etc., as the attribute value for telephone and IP telephone applications, an email address as the attribute value for an email application, and a file location as the attribute value for a local file display application, as an example. By so doing, it becomes possible to treat, as channels, not only the Internet browser application, but also the telephone application, the IP telephone application, the email application, and local file display applications (ex. photographs, movies, and music, to name a few examples).

Defining Multiple Channel Groups

A plurality of channel group descriptions may be defined for each category, and a button (hereinafter, a "category button") be provided corresponding to each category, as in the example shown in FIG. 2(b). In that example are there provided category buttons corresponding to four categories: "TV," "Movie," "Internet," and "Photos." Each category button is assigned a channel group description. Each channel group description is assigned one or more channel sets. Pressing one of the "TV," "Movie," "Internet," or "Photos" category buttons shown in FIG. 2(b) causes a switching to the associated channel group description. Pressing a category button in the same category causes a switching of channel sets within the same category according to an associated channel group description. Specifically, if a channel in the category "Movie" is being currently viewed, pressing the category button "Movie" causes a switching of channel sets to another channel set according to a channel group description corresponding to the same category "Movie." An operation in such a case is shown in FIG. 6 as an example.

Figure 6:
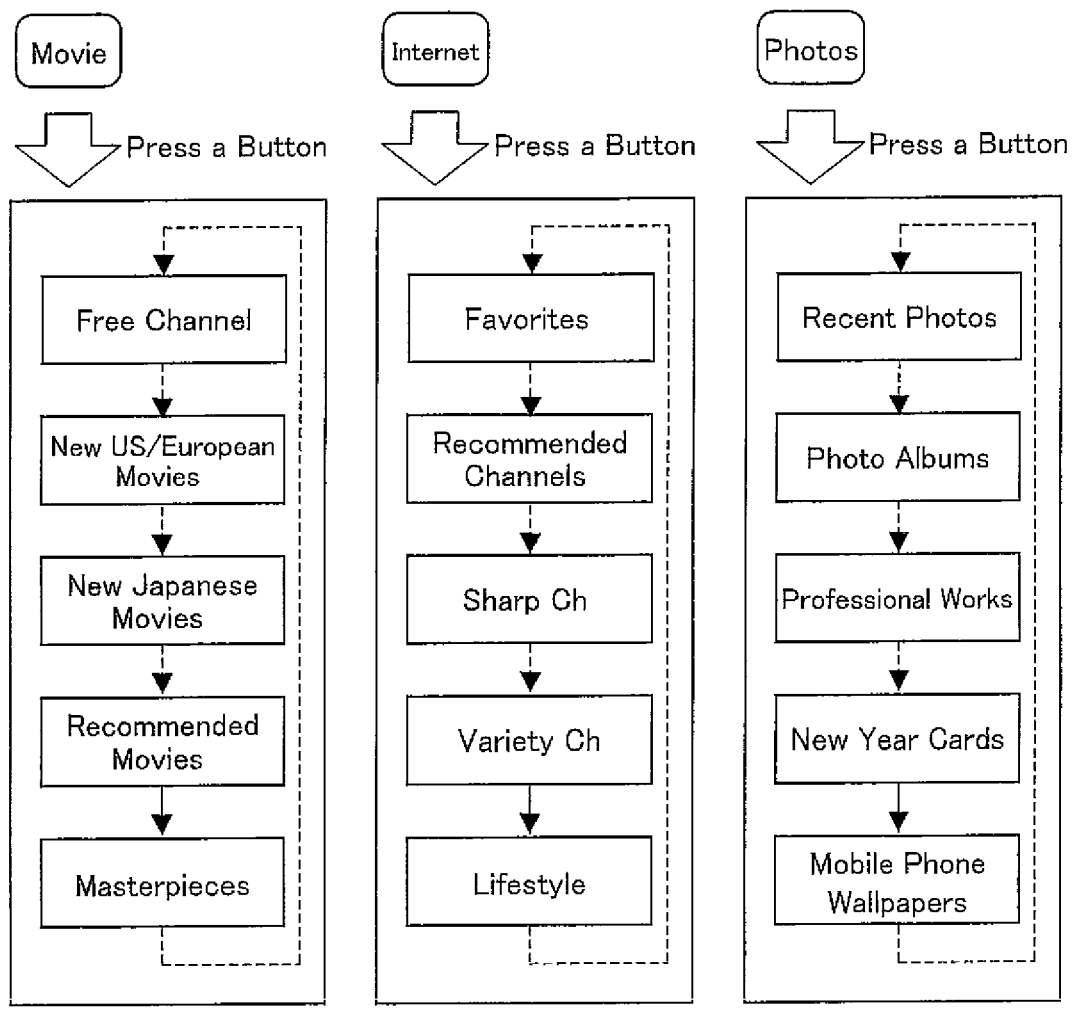
FIG. 6 illustrates assignment of channel sets to category buttons on a remote controller used with a receiving device 100B in accordance with embodiment 1 of the present invention and how the channel sets are switched at each press of a category button.

As illustrated in FIG. 6, each category button is assigned a channel group description. Every time a category button is pressed, the channel set described in the channel group description switches sequentially.

Apart from the category buttons, there may be provided a separate global channel set switching button with which to sequentially select from all the channel sets assigned to the categories, that is, the channel sets described in the channel group descriptions. In that case, pressing the global channel set switching button causes a sequential switching of the channel sets. For example, After the last channel set under the category "Movie," the first channel set under the "Internet" category is selected; after the last channel set under the category "Internet", the first channel set under the "Photos" category is selected; and after the last channel set under the category "Photos", the first channel set under the category "Movie" is selected. Channel sets are switched across the categories.

The remote controller may be provided with a category switching button to switch between categories and a channel set switching button to switch between channel sets under the currently selected categories. In that case, the user first selects a desired category using the category switching button and then selects a desired channel set in the channel group description corresponding to the category using the channel set switching button. Furthermore, in this configuration, pressing the channel set switching button when the channel set selected using the global channel set switching button is the last channel set under that category may cause a selection of the first channel set under a next category.

Configuration of Receiving Device Capable of Categorization

Figure 7:
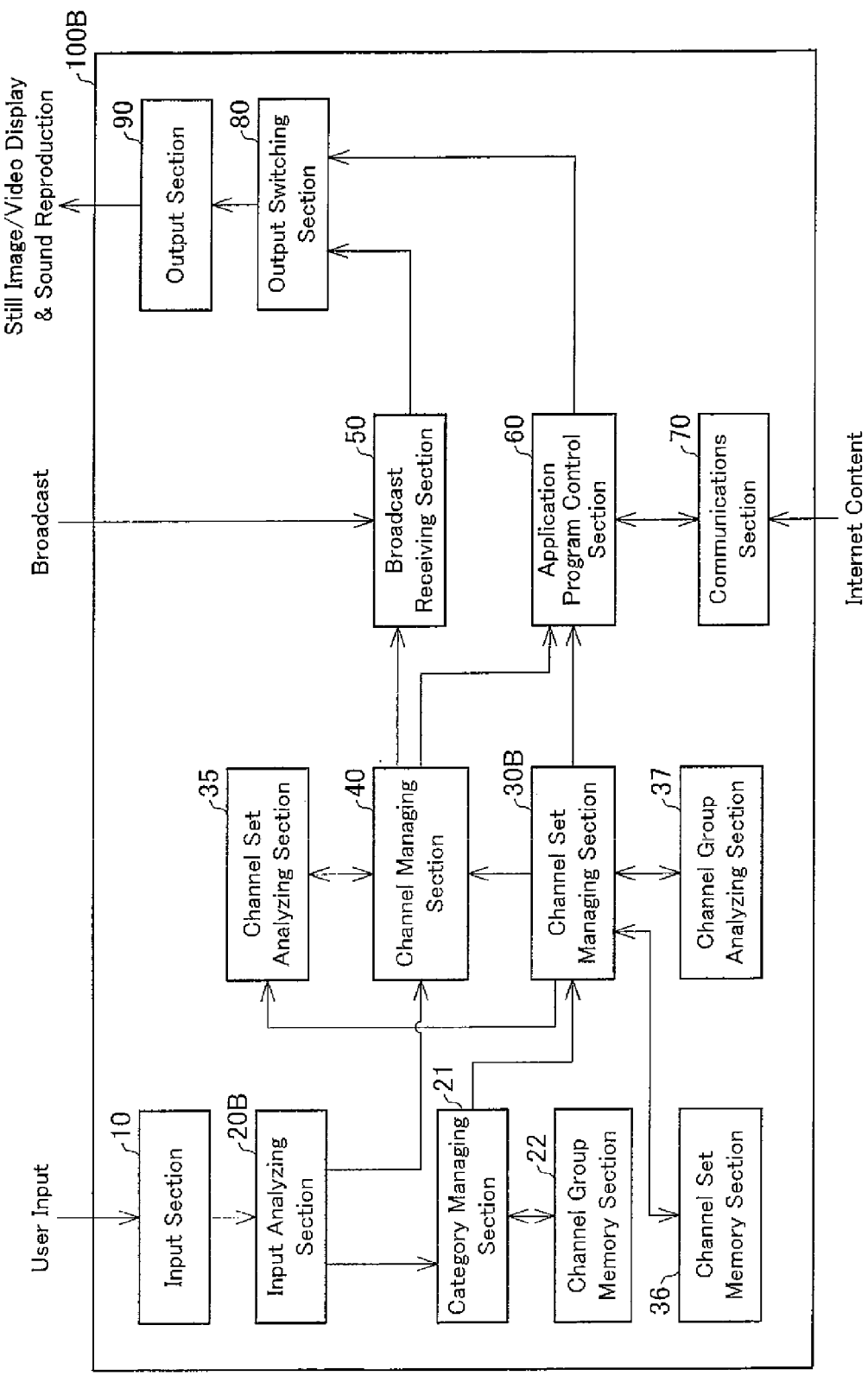
FIG. 7 is a function block diagram of a major part of the receiving device 100B classifying the channel sets into categories in accordance with embodiment 1 of the present invention.

FIG. 7 is a function block diagram of a major part of the receiving device 100B classifying the channel sets into categories. The description here will discuss the configuration and operation only in relation with additions and changes being made to the function block diagram shown in FIG. 1.

First, the input analyzing section 20B determines whether or not one of the category buttons was pressed by the user. If one of the category buttons was pressed, the input analyzing section 20B notifies a category managing section (category managing means) 21 of which category button that category button is. A channel group memory section 22 contains channel group descriptions corresponding to the categories. Based on the notification, the category managing section 21 sets up a channel set managing section 30B according to a channel group description corresponding to the category button which was pressed and passes control to the channel set managing section 30B. According to instructions, the channel set managing section 30B selects a channel set according to a description in the channel group description and switches from the current channel set to a requested channel set.

Related Channel Function

Channels related to the channels in the channel set description (hereinafter, "related channels") may also be listed as shown in FIGS. 8(*a*) and 8(*b*). In the example of FIG. 8(*a*), the tags <prevch> and tag <nextch> are each designated as an identifier for a related channel. In the example of FIG. 8(*b*), the tag <relch> is used as an identifier for a related channel to list related channels.

Figure 9:
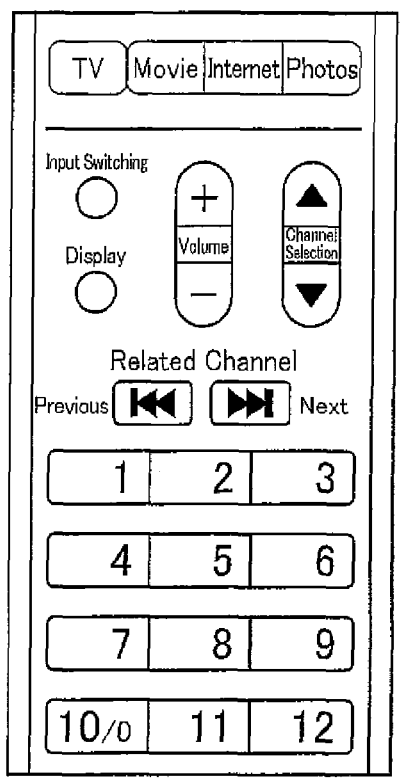
FIG. 9(a) is a drawing of an example of a remote controller, provided with a "Previous" and a "Next" button by which a related channel can be selected, for use in the receiving device 100 in accordance with embodiment 1 of the present invention.
FIG. 9(b) is a drawing of an example of a remote controller, provided with a "Back" and a "Next" button, for use in the receiving device 100 in accordance with embodiment 1 of the present invention.
Figure 9:
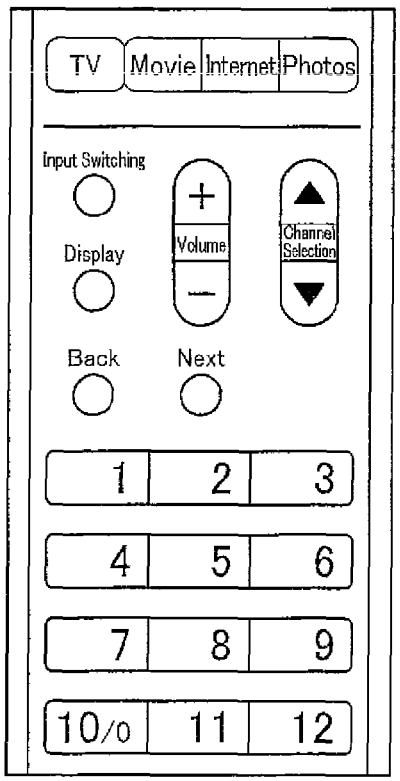

FIGS. 9(*a*) and 9(*b*) illustrate examples of remote controllers with for user manipulation as a method of manipulation in the switching the content being displayed to a channel related to the current channel. The remote controller in FIG. 9(*a*) has a "Previous" button and a "Next" button for switching to a related channel. The channel current being displayed is replaced by the related channel specified by the tag <prevch> when the "Previous" button is pressed and by the related channel specified by the tag <nextch> when the "Next" button is pressed. In the example of FIG. 8(*a*), the tag <prevch> specifies channel "101" as a previous related channel for channel "002", and the tag <nextch> specifies channel "205" as a next related channel for channel "002." The receiving device 100B switches the display channel to channel "101" if the "Previous" button for a related channel is pressed while channel "002" is being displayed. The device 100B switches the channel to channel "205" if the "Next" button is pressed. If a channel selection button "▲" (or "▼") is pressed while channel "002" is being displayed, the device 100B of course switches the display to channel "001" (or "003").

After the display is switched to channel "101" in response to a press of the "Previous" button for a related channel, a press of the channel selection button "▲" (or "▼") causes switching of the display to channel "100" (or "102"). In this situation, no channel switching may occur as a result of manipulation of the channel selection buttons if the "Previous" or "Next" button for a related channel is pressed. In that case, after the display is switched in response to a press of the "Previous" or "Next" button for a related channel, a press of the channel selection button "▲" (or "▼") causes switching of the display to channel "001" (or "003").

In the example above, related channels may be specified for channel "101." In that case, after the display is switched to channel "101," a press of the "Previous" or "Next" button for a related channel may allow further switching to a related channel specified for channel "101."

In the example shown in FIG. 8(*b*), the tag <relch> specifies related channels "301," "302," "303," "304," and "305" for channel "002." A press of the "Previous" or "Next" button for a related channel while channel "002" is being displayed selects channel "301," "302," "303," "304," or "305." In this case, similarly to the example above, either channel "001" or "003" is selected using the channel selection button "▲" or "▼." The description above applies also to operation of the channel selection buttons after the display is switched to a related channel.

Another channel set may be specified as a second channel set as a channel described in a channel set description as illustrated in FIG. 8(*c*). In the example in FIG. 8(*c*), the channel set description childchannel.csd is specified as channel "002." In the example, the channel managing section 40 upon selection of channel "002" instructs the channel set managing section 30B to switch from the current channel set to a channel set corresponding to the channel set description childchannel.csd. As a result, the channel set managing section 30B switches from the current channel set to a channel set corresponding to the second channel set description childchannel.csd. After the switching, a press of the channel selection button "▲" or "▼" causes switching between channels described in the second channel set description childchannel.csd. If the channel selection button "▼" is pressed while the last channel defined in the childchannel.csd is being displayed, the display is switched to the original channel set.

In the example, the remote controller may be further provided with other buttons: a button for switching to the second channel set and a button for returning to the original channel set after having switched to another channel set. An example of a remote controller for such cases is shown in FIG. 9(b).

Figure 10:
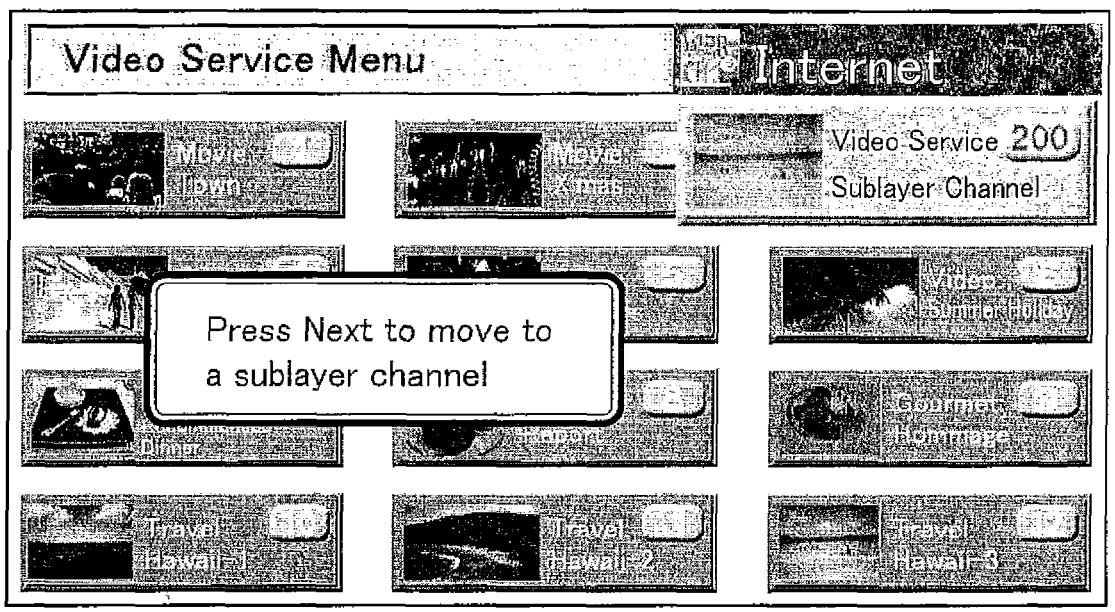
FIG. 10(a) is an illustration of a screen display example in accordance with embodiment 1 of the present invention where the user is presented with the contents of a second channel set and a manipulation to switch to the second channel set (in this case, a press of the "Next" button).
FIG. 10(b) is an illustration of a screen display example in accordance with embodiment 1 of the present invention where the user is presented with a display of channels in the second layer channel sets, for example, in a different color so that the user can easily recognize the channels.
Figure 10:
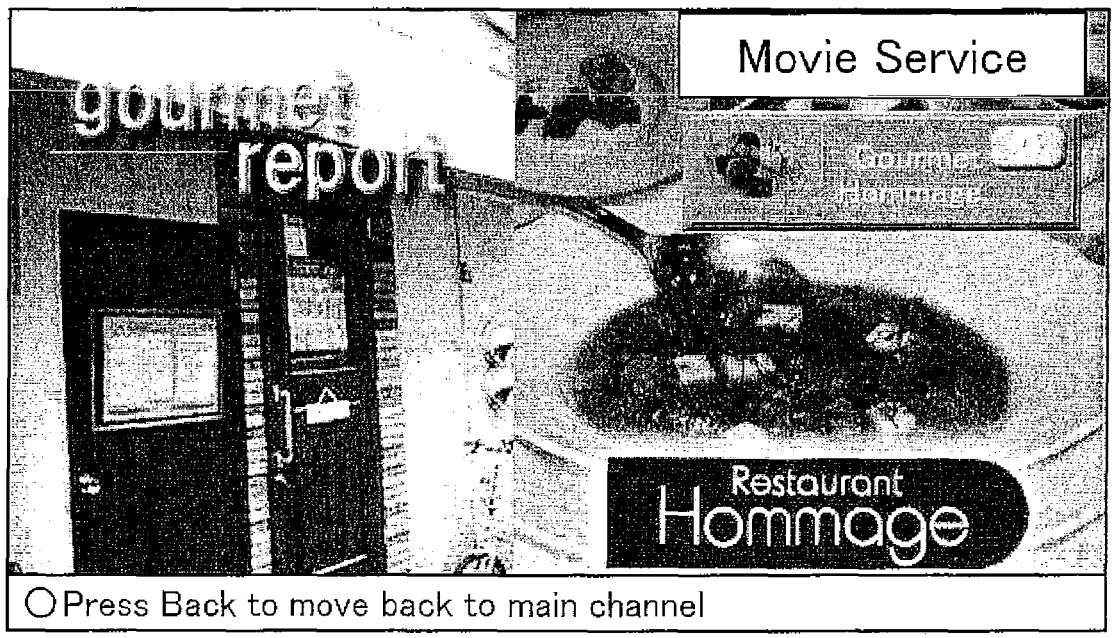

With channel "002" being selected, the user is presented with a display showing a manipulation (here, a press of the "Next" button) for switching to the second channel set (channel 002), as well as the contents of the second channel set, as illustrated in FIG. 10(a).

The screen showing the contents of the second channel set being displayed here may be a menu screen for the second channel set or text-only information (e.g. URLs, screen, or titles) explicitly described in the second channel set description.

Furthermore, when each channel number and its contents are displayed for a channel call, OSD, etc., those channels with a second channel set may be presented to the user in an easy-to-recognize manner by, for example, changing display color. If the user presses the "Next" button on the remote controller while the screen is being displayed, the display switches to the second channel set.

The second channel set description childchannel.csd contains the name of the original channel set description which references the second channel set description childchannel.csd (channel set definition net_reco.csd, in this example). In FIG. 9(b), the original channel set described in the second channel set description can be restored by pressing the "Back" button while the channel set description childchannel.csd is being used.

Furthermore, the second channel set may be manipulated using the "Previous" or "Next" button for a related channel shown in FIG. 9(a). In that case, a press of the "Previous" or "Next" button for a related channel while channel "002" is being selected causes selection of a channel from the channels described in the second channel set description. A press of the channel selection button "▲" (or "▼") causes selection of a channel according to the channel set description for the original channel set.

Other arrangements are also possible. A control panel listing channels described as related channels may be displayed so that the user can select related channels by manipulation through the control panel.

In the example above, channel numbers are contained in the channel set description using an identifier for related channels. A URL showing the contents of a channel may be directly described instead of the channel number at a place specified by the identifier for a related channel.

If the second channel set is handled by any of the methods above, when the second channel set is selected, it can be explicitly specified on the screen that the current onscreen display shows a second-layer channel set.

In addition, when each channel number and its contents are displayed for a channel call, OSD, etc., those channels in the second-layer channel set may be presented to the user in an easy-to-recognize manner by, for example, changing display color. An example of such a display is shown in FIG. 10(b).

In the example in FIG. 10(b), "Video Menu" in the first layer is displayed in blue, and "Gourmet Report", or the channel content of a channel in the second layer, is displayed in green. There is also displayed a guide for navigating back to the channel in the first layer, or the original channel.

The examples above all related to the second channel set. The same methodology applies to a greater hierarchy, for example, when a third related channel is described in the second channel set.

Obtaining Description from Server

The channel group description and the channel set description may contain a source for a channel group description file and a source for a channel set description file respectively. The following description will take the channel set description as an example. A similar method may be used to obtain a channel group description from a server to update the description.

FIG. 11 shows a description example of a channel set description containing a source for a channel set description file. The descriptions, 101 and 102, enclosed by broken lines are the additions to the channel set description shown in FIG. 4. The statement 101, enclosed by a broken line, shows the URL of a source. The statement 102, enclosed by a broken line, shows a file update timing. In the description example in FIG. 11, the tag <sy:updatePeriod> specifies the period of an update interval, the tag <sy:updateFrequency> specifies an updating frequency within the update period, and the tag <sy:updateBase> specifies a reference time for the update period. In this case, the reference time gives the reference, and a confirmation for updating is done the number of times specifies by the update frequency within the period specified by the update interval. The file update timings may be specified by another method rather than as relative times from a reference time as above, for example, by describing in terms of absolute times the validity of a corresponding channel set description or the time when a next confirmation for updating should be done. In that case, the receiving device performs a confirmation for updating at or after the specified time.

The identity number of the receiving device may be transmitted to the server in the obtaining. The server, based on the received identity number of the receiving device, returns a channel set description or a channel group description which is suitable for the receiving device. The identity number may be determined according to a special numbering system set up separately or an existing numbering system being used for network communications.

Configuration of Receiving Device Obtaining Description from Server

Figure 12:
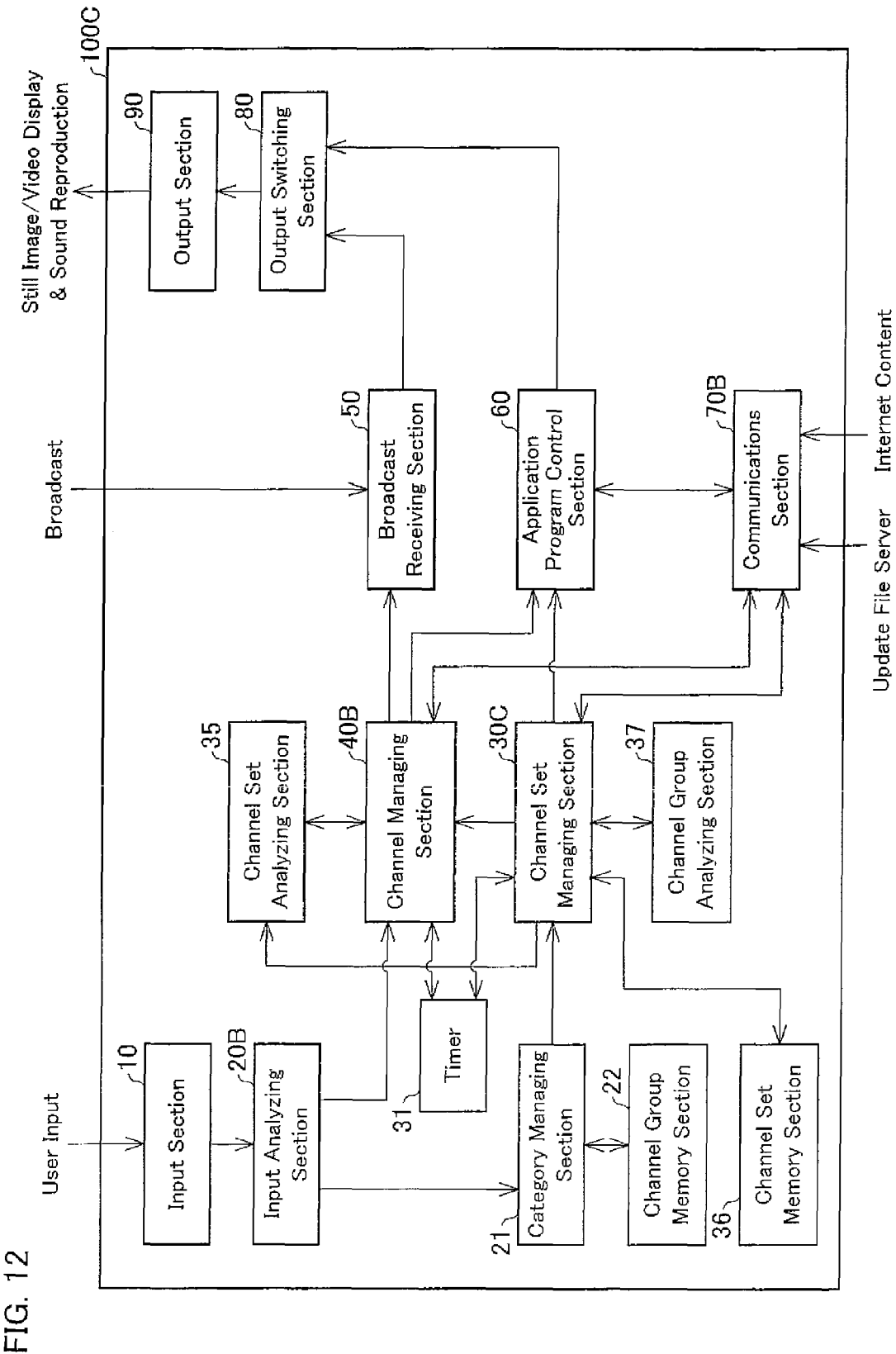
FIG. 12 is a function block diagram of a major part of a receiving device 100C updating a channel group description file and a channel set description file at a preset time interval in accordance with embodiment 1 of the present invention.

FIG. 12 is function block diagram of a major part of a receiving device 100C updating a channel group description file and a channel set description file at a preset time interval. The following description will focus on the configuration and operation where additions or changes are made to the function block diagram shown in FIG. 7.

The channel set memory section 36 and the channel group analyzing section 37 are controlled by the channel set managing section 30C. The updating of the channel group description and the channel set description is controlled by the channel set managing section 30C.

First, if the update file source and the update interval are embedded in the channel set description upon analysis of a channel set description as a description example shown in FIG. 11, the channel set analyzing section 35 calculates a next update time from the description of the update interval in the case of relative time and obtains the next update time in the case of absolute time, and sets up the timer 31 according to the determined time.

In the example in FIG. 11, if, for example, there is only a description of an update file source as in the statement 101 and there is no description of an update interval as in the statement 102, the update time may be determined from an update interval setting or an absolute time which are specified in advance in the receiving device, and the timer 31 be set up accordingly.

At the preset time, the timer 31 notifies the channel set managing section 30C which made the time setting of reaching the preset time. Upon the notification, the channel set managing section 30C accesses an update file server via a communications section 70B, obtains a channel set description file, and updates the channel set description stored in the channel set memory section 36. The URL of the update file server may be specified by the method shown in the description example in FIG. 11, set separately in the receiving device 100, or fed from the user before obtaining an update file. After the channel set description file is updated, the updated channel set description is used in the selection of a channel set or a channel. The channel group description is updated similarly. In that case, the updated channel group description is stored in the channel group memory section 22 or if there is provided no channel group memory section 22, set in the direct channel group analyzing section 37.

In the description above, it was the channel set managing section 30C that performs the update. A separate update means may be provided which performs similar update according to an instruction from the channel set managing section 30C.

The update files for the channel group description and the channel set description may be obtained using a TLS (Transport Layer Security) or like communications protocol for better concealment. The description file itself or the storage site for the description file may be encrypted for improved concealment.

In such concealment, the encrypted update file source and update interval may be separately embedded as illustrated in FIG. 13(a). The example in FIG. 13(a) illustrates a method of obtaining a description update file encrypted by DES using the TLS 1.0 communications protocol.

To use the update, the receiving device updates the description file at the update interval specified by the sub-element tags <sy:updatePeriod>, <sy:updateFrequency>, and <sy:updateBase> from the source specified by the about attribute in the tag <update>.

Similarly, as illustrated in FIG. 13(b), multiple update file sources and update intervals may be embedded using description versions. In the example in FIG. 13(b), net_v10.csd is obtained as an update file to update a description to version 1.0 and net_v20.csd is obtained as an update file to update a description to version 2.0.

Figure 14:
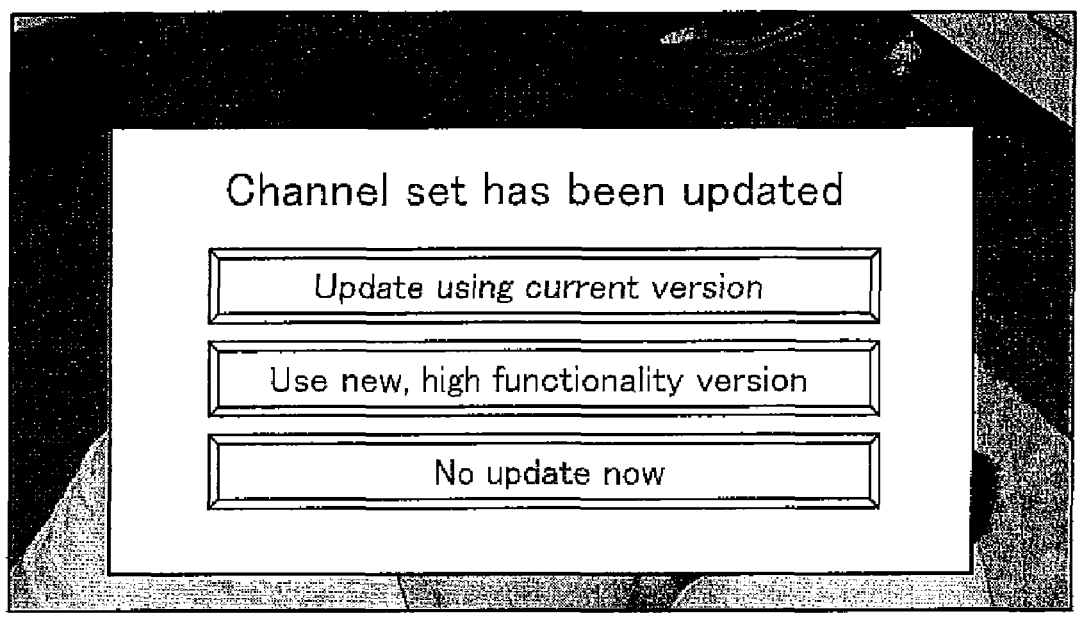
FIG. 14 is an illustration of a screen display example where a receiving device in accordance with embodiment 1 of the present invention is asking the user the version of a description file to be obtained.

As can be seen form these examples, when multiple pieces of update obtaining information are embedded, the source is determined depending on how the receiving device is implemented. An enquiry may be made to the user at that time. An example of the enquiry screen is shown in FIG. 14.

Method of Adding New Channel Set

A new channel set description from a channel set server on a network may be downloaded to add the description to a channel group description by a method similar to the one for obtaining a description file from an update file server. In that case, after downloading the file, the user is asked in which category, that is, in which channel group description the new channel set to be added should be contained. The category managing section (channel group managing means) 21 is set up according to that information so that the new channel set can be added to the category desired by the user.

Method of Automatically Adding New Channel

A new channel set description further downloaded may be automatically added to a specified category by specifying in the channel set description, or to a selected category, into which the new description is to be added. FIG. 15(a) shows a description example of a channel set definition in such cases. A channel group description for adding a channel set description may be explicitly specified by a tag <dc:relation> shown in the description enclosed by a broken line. In this description example, the channel set description downloaded is added to the channel group description "net.ind." The channel group description may be specified by the name of a category (ex. "Internet"), rather than being explicitly specified like "net.ind." In that case, the category managing section 21 selects a channel group description corresponding to the category "Internet" and adds to an associated channel group description.

The receiving device 100 adds a downloaded channel set description to a corresponding category if the device 100 has the category or the channel group description specified in the downloaded channel set description. Before the adding, the user may be asked if he allows the addition to category specified in the description. A receiving device 100 on which the channel set categorizing function is not implemented may ignore the description.

In the examples above, methods were described whereby information on updates and additions to the channel set description was obtained from a server via the communications section (reading means) 70B. Information may be obtained from an external storage medium, such as a CD, a DVD, or an external memory. Additions may be made to the channel group description by a similar method to the addition to the channel set description.

Sequence in which New Channel Sets are Added

A new channel set is added before or after the channel sets arranged in a row in the existing channel group description. The channel set managing section 30 may have a channel set rearranging function (channel set sorting means) so that upon adding a channel set, the names of channel sets can be rearranged by Japanese Kana rendition, ABCs, the URLs of the servers providing the channel sets, the names of particular channels (e.g. the first channel of each channel set), URLs, the dates of last access to the channel sets, or the dates of last updating of the channel sets.

The channel set description may include embedded therein priorities for channel sets as enclosed by a broken line in FIG. 15(b). In the example, the tag <priority> specifies priority "2."

In this case, the channel set managing section 30 rearranges the channel sets sequentially by the specified priority-representing numbers by the channel set rearranging function. That is, the channel set description shown in FIG. 15(b) is placed below another channel set description that has a priority value of 1 and above other channel set descriptions that have a priority value of 3 or greater. Those channel set descriptions which have a lower priority value appears above the others in the example. The descriptions may of course be listed in descending order of their priority numbers. The priority may be indicated, for example, by letters, rather than numerical values. A plurality of conditions may be applied in the rearrangement: for example, two descriptions having the same priority may be sorted by Japanese Kana rendition of the channel sets.

Another method of rearranging channel sets upon the addition of a new channel set may involve use of a separate file defining a rearranging method to be implemented upon the addition of a channel set. For example, a priority channel set file may be used to place those channel sets which have the same title, URL, etc. as those given in the priority channel set file on top of the list. The priority channel set file may be pre-recorded in the receiving device 100, downloaded from a server via the communications section 70B, or obtained from an external storage medium, such as a CD, a DVD, or an external memory.

Channel Set/Channel Setup Screen

Figure 16:
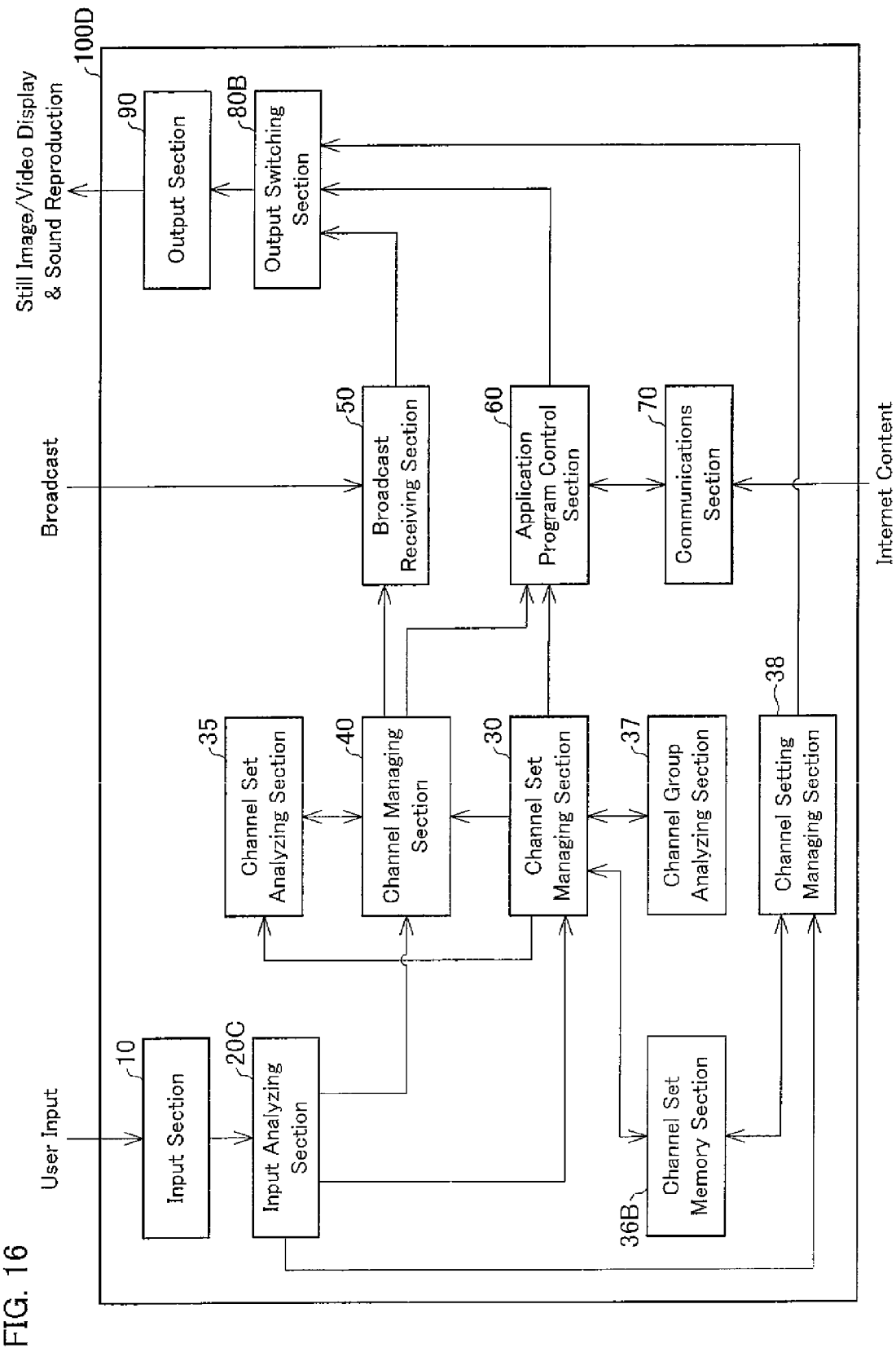
FIG. 16 is a function block diagram of a major part of a receiving device 100D containing a channel setting managing section 38 in accordance with embodiment 1 of the present invention.
Figure 17:
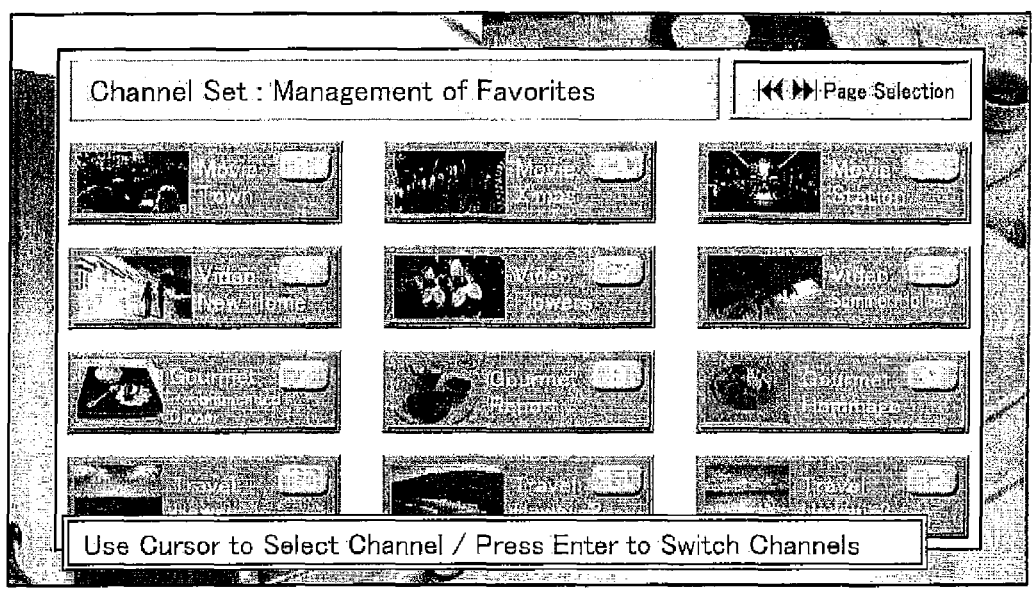
FIG. 17 is an illustration of a screen display example which the channel setting managing section 38 presents to the user in accordance with embodiment 1 of the present invention when a channel sequence is to be changed.

So far, channel sets in a channel group definition and channels in a channel have been assumed to be arranged by an initially defined sequence or a server-defined sequence. Instead, the user may rearrange the channel sets. In that case, there is provided a channel setting managing section 38 for setting a sequence for the channel sets and channels. FIG. 16 shows a function block diagram for the case. FIG. 17 shows an example of channel setup screen.

In the function block diagram shown in FIG. 16, the channel setting managing section 38 receives a channel re-sort command from the user via the input section 10 and the input analyzing section 20C. Upon receiving the channel re-sort command, the channel setting managing section 38 obtains a channel set description from the channel set memory section 36B and displays a channel list for the user via the output switching section 80B and The output section 90. Thereafter, the user gives a command to the receiving device 100D on how to rearrange the channels based on the displayed list of channels. The channel setting managing section 38 receives results of the rearrangement by the user from the user via the input section 10 and the input analyzing section 20C and reflects the results in the channel set description. The channel setting managing section 38 stores the channel set description reflecting the results of the rearrangement into the channel set memory section 36B.

The channel setup screen example in FIG. 17 shows a list of channels. The user specifies which channels to be replaced by using the cursor and replaces channels by pressing the Enter key.

The description above explained an example of the user manually replacing channels. The channels may be automatically rearranged similarly to the rearrangement performed on the addition of a channel set by providing the channel managing section 40 with a channel rearranging function (channel sorting means).

An automatic rearrangement may be done, for example, by Japanese Kana rendition, ABCs, the URLs of the servers, the dates of last access to the channels, or the dates of last updating of the channels. If the channels are pay channels, they may be rearranged by the amounts of charge. The channels may be rearranged by the number of accesses made in descending order by obtaining from the communications section 70 information on the number of accesses to each channel.

The rearrangement of channels were described above. Channel sets may be rearranged similarly.
Generation of Channel Set Description from Existing HTML, Local Folder, and History The channel set description may be not only prerecorded in a receiving device or provided from a server, but also generated in the receiving device.

If the channel set description is provided from a server, the server may not only provide a channel set prepared in advance, but generate a channel set upon receiving a request from the receiving device.

The following will describe automatic generation of a channel set description, taking the generation in the receiving device as an example. Of course, the channel set description may be generated similarly in the server device.

Figure 18:
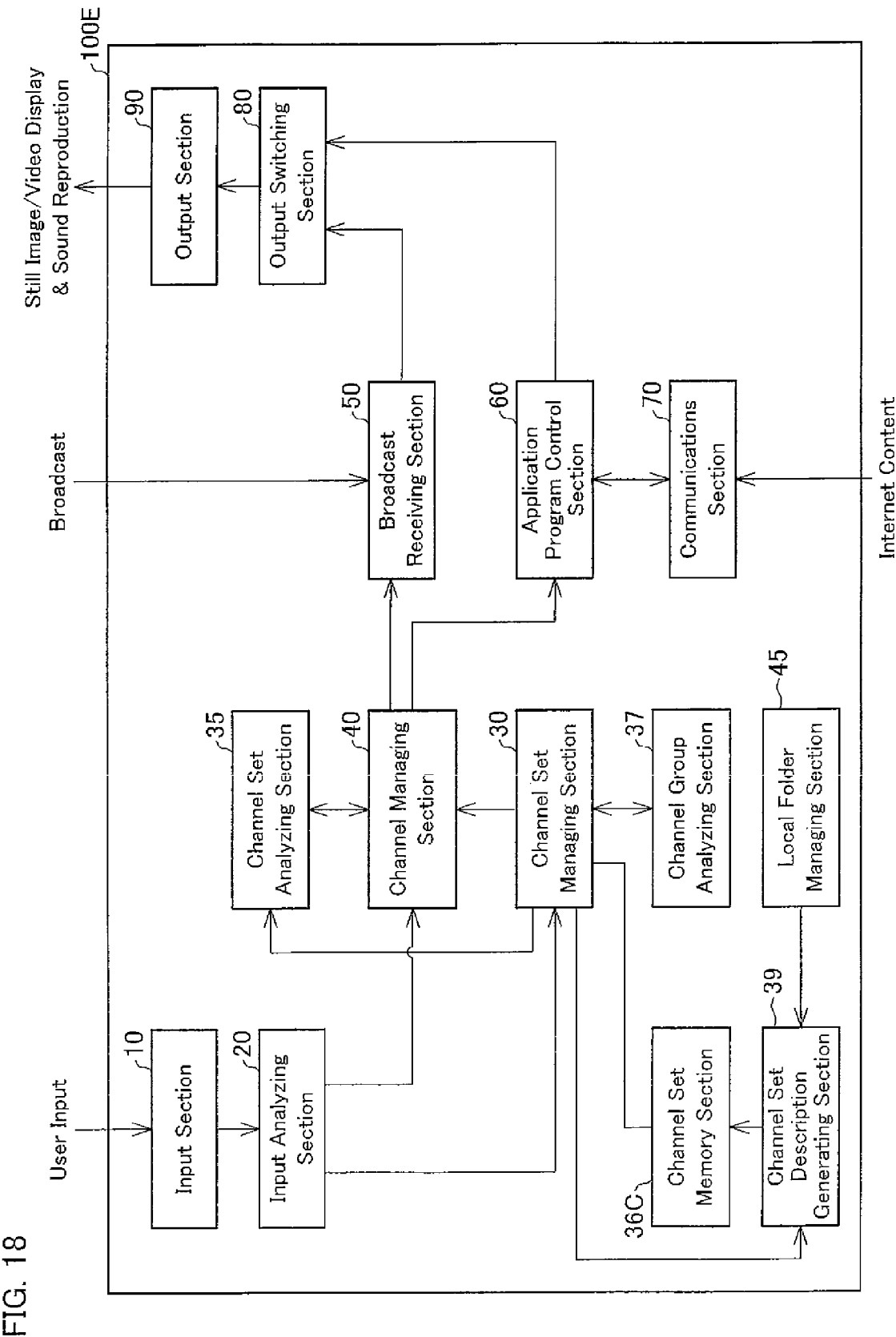
FIG. 18 is a function block diagram of a major part of a receiving device 100E containing a channel set description generating section 39 and a local folder managing section 45 in accordance with embodiment 1 of the present invention.

The receiving device 100E, in addition to the existing configuration, further includes a channel set description generating section (channel set description generating means) and a local folder managing section (channel set description generating means) 45. FIG. 18 shows the configuration in a function block diagram.

The generation of a channel set description from a file in a local folder in the receiving device 100E will be described as the first example. The channel set description generating section 39 extracts URLs, titles, and icons from a file in a local folder via the local folder managing section 45, embeds them as description elements for the individual channels in the channel set description and stores the resultant channel set description to the channel set memory section 36C. Specifically, the section 39 extracts URLs, titles, and icons from a favorites folder in the personal computer or a similar group of files describing shortcuts to URLs, embed them as description elements for channels in a channel set description template, so that the URL shortcuts in the favorites folder can be handled as channels. Similarly, the channel set description may be generated from a file in a history folder and a file describing a search result.

Figure 19:
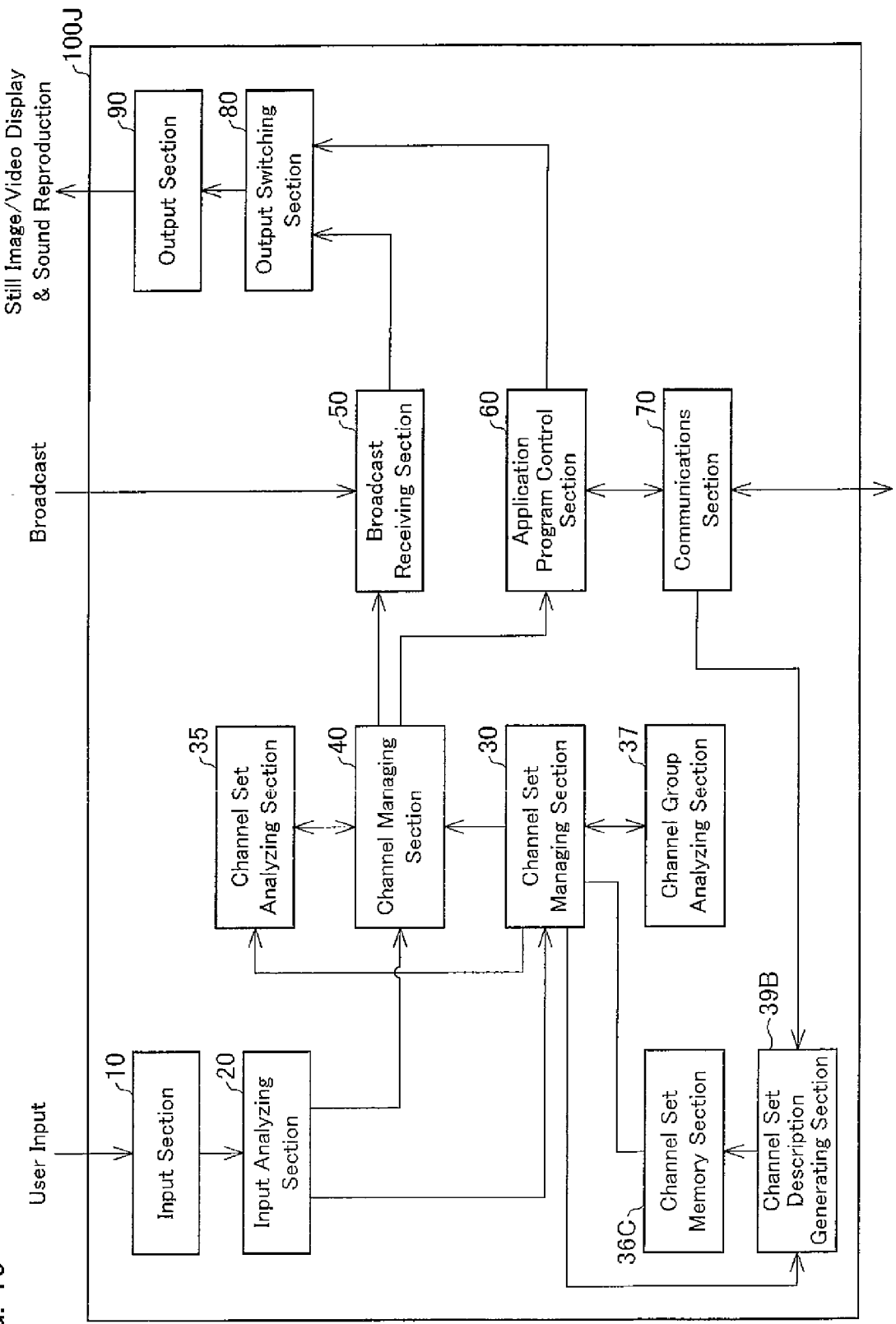
FIG. 19 is a function block diagram of a major part of a receiving device 100J containing a channel set description generating section 39B and obtaining a link collection from a service server in accordance with embodiment 1 of the present invention.

Another example is to obtain a collection of links written in XML, HTML, SVG, RSS, CSV, or plain text from a service server for the generation of a channel set description. FIG. 19 shows a configuration In that case.

By this method, a search result can be generated as a channel set from a URL in a search result.

Figure 20:
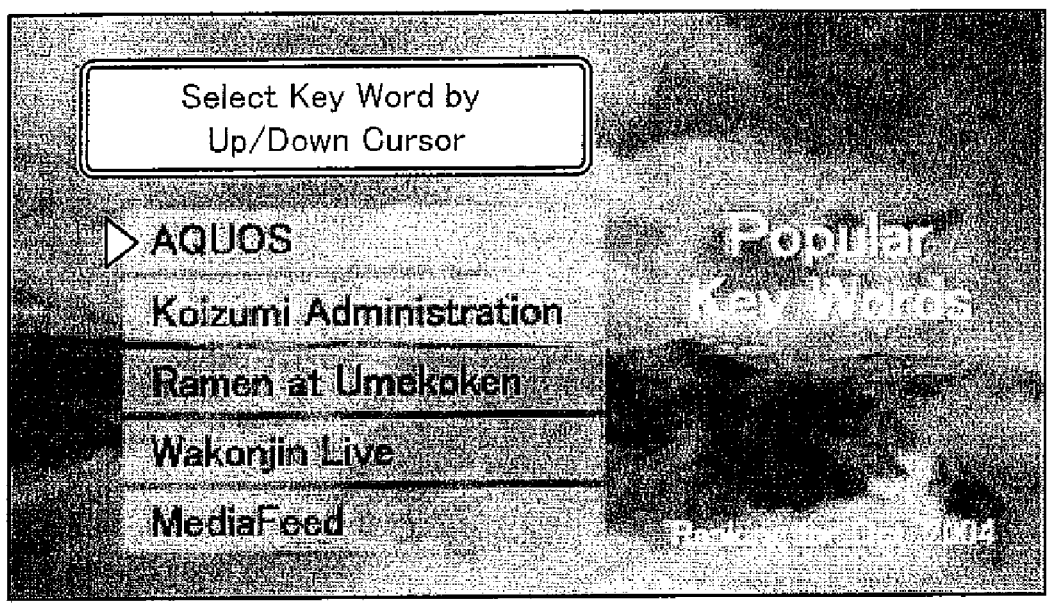
FIG. 20 is an illustration of a search screen display example presented to the user in accordance with embodiment 1 of the present invention.

The channel managing section 40 displays search screen as illustrated in FIG. 20. In this example, the user selects a search key word; instead, the section 40 may of course display a screen enabling the user to enter a text string. The search key words may be prerecorded the receiving device 100J or obtained from a service server, for example, a search ranking site, via the communications section 70. Furthermore, the search screen may be treated as one of channels and displayed using a channel selection button as discussed earlier. A search button or other dedicated button may be provided.

As the user selects or enters a key word, the channel managing section 40 accesses a search server via the application program control section 60 and the communications section 70 to carry out a search using the user-defined key words. Search results from the search server are communicated to the channel set description generating section 39B via the communications section 70. The channel set description generating section 39B generates a channel set description from a list of the search results.

By this method, once the user selects or inputs a key word, the user can have the search results displayed sequentially at a single push of a button on a remote controller.

Figure 21:
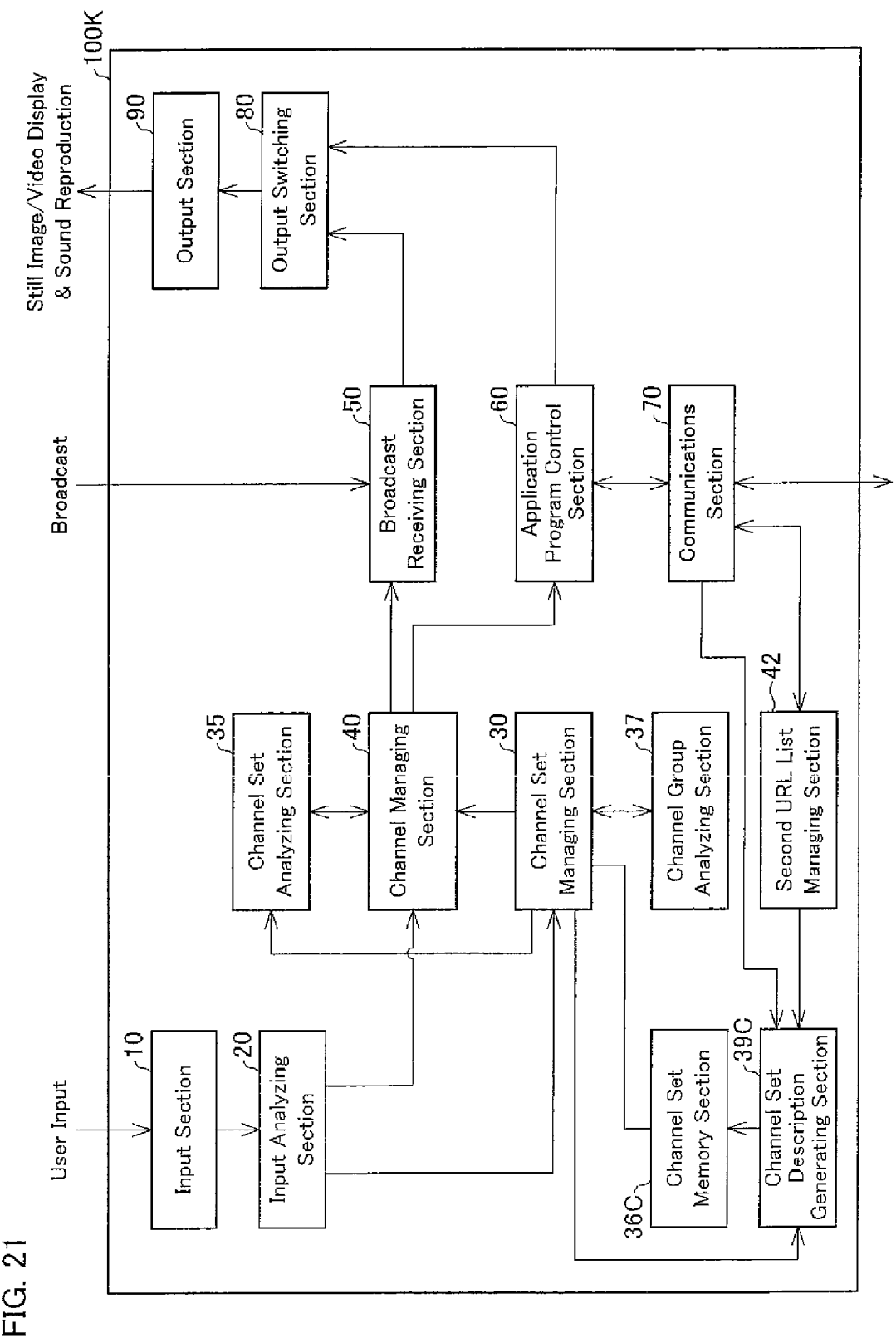
FIG. 21 is a function block diagram of a major part of a receiving device 100K containing a channel set description generating section 39C and a second URL list managing section 42 in accordance with embodiment 1 of the present invention.

Furthermore, as shown in the function block diagram in FIG. 21, there may be provided a second URL list managing section 42 so that a second URL list obtained via the separate communications section 70 can be used in the channel set description generating section 39C.

In that case, as mentioned earlier, the channel set description generating section 39C can embed the URLs in the second URL list in the channel set description when the channel set description is generated from a search result.

For example, if the URL of an ad site is obtained as the second URL list, a channel for the ad site along with the search result channel can be included in the channel set description. In the foregoing description, the second URL list managing section 42 obtained the second URL list via the communications section 70. A second URL list may of course be used which is prepared and stored in advance inside the receiving device 100K.

Figure 22:
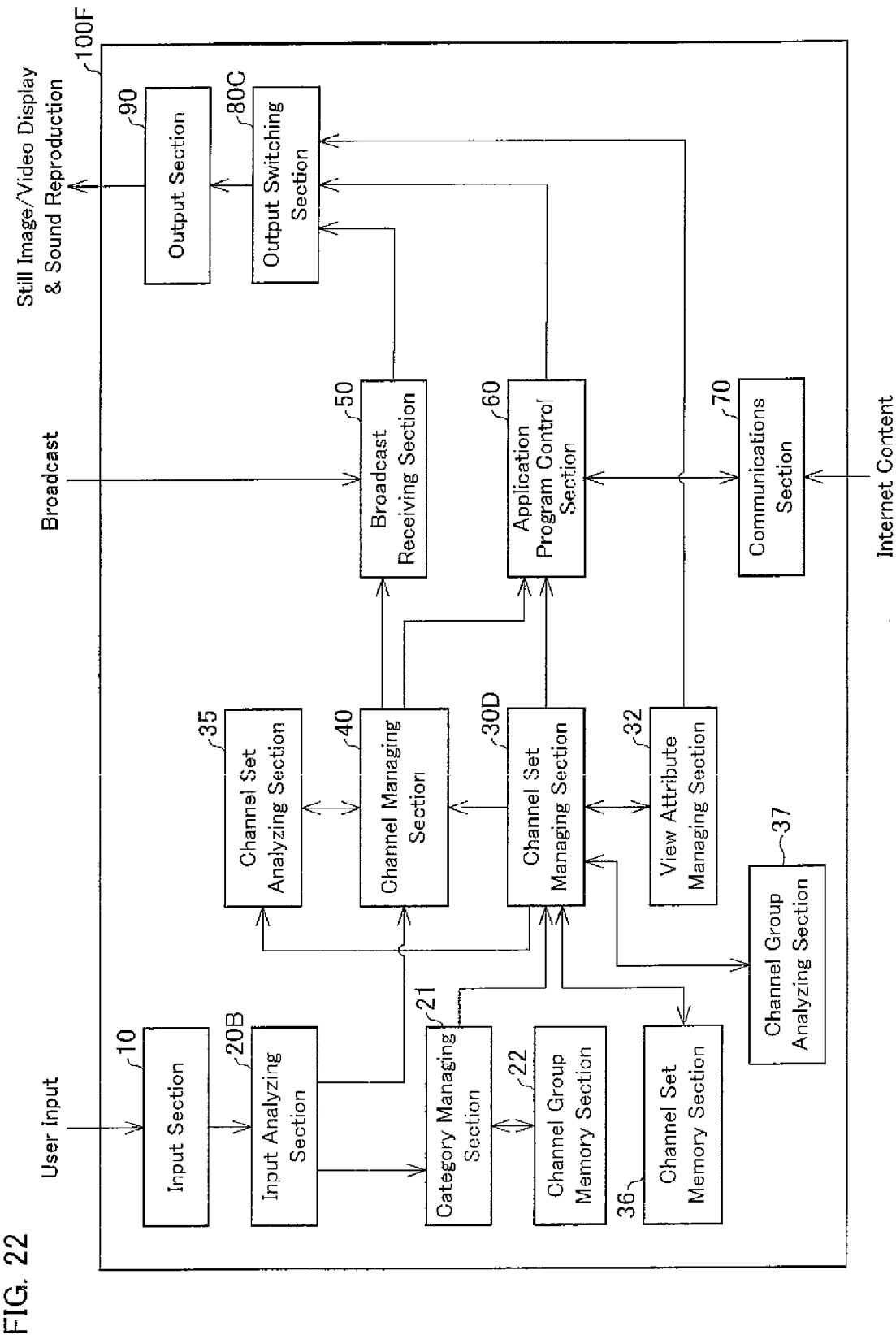
FIG. 22 is a function block diagram of a major part of a receiving device 100F containing a view attribute managing section 32 in accordance with embodiment 1 of the present invention.

The channel set description may be generated, for example, upon startup of the receiving device 100E, 100J, or 100K, using a timer (ex. upon regular updates), or when a corresponding channel set is selected.
Changes to Channel Set Description Depending on Attributes of User and Receiving Device FIG. 22 shows a function block diagram of a major part of a receiving device 100F in accordance with the present invention which includes a view attribute managing section (attribute managing means) 32. The following description will focus on the configuration and operation where additions or changes are made to the function block diagram shown in FIG. 7.

The channel set description may be changed based on attribute information for user and receiving device 100F. In that case, a view attribute managing section 32 is provided. Channel set descriptions used by the channel managing section 40 may be replaced or channel switching may be limited to only some channels in the channel set description, according to either the user attribute or the terminal attributes of the receiving device 100F managed by the view attribute managing section 32 and information as to whether or not a particular channel may be viewed.

First, the input section 10 receives an input from the user of the user attribute information or the terminal attribute information for the receiving device 100F and transfers the received attribute information to the view attribute managing section 32 over a path (not shown). The view attribute managing section 32 determines, from the attribute information received, whether each of the channel sets and channels may be viewed by the user and on the terminal for the receiving device 100F and at the same time, instructs the channel set managing section 30D and the channel managing section 40 to make changes to the channel group description and the channel set description. If a channel set or channel that is determined to be not viewable is selected, an enquiry screen is displayed to the user to ask if the user wants to change the user attribute or the terminal attribute for the receiving device 100F. If the user enters an attribute changing command, the view attribute managing section 32 instructs, according to the command, the channel set managing section 30D and the channel managing section 40 to change the channel group description and the channel set description.

Figure 23:
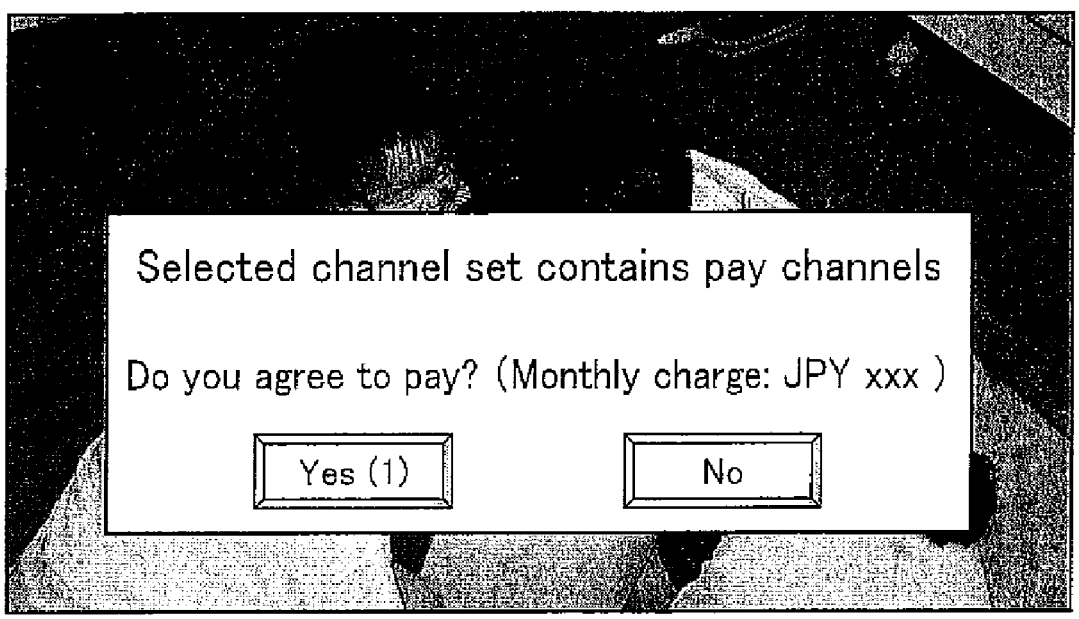
FIG. 23 is an illustration of a screen display example in accordance with embodiment 1 of the present invention where the receiving device 100F is asking the user whether or not to send a purchase request.

An example of actual use is given below. The view attribute managing section 32 contains settings on whether or not the user has applied to purchase view of a pay channel set, that is, whether or not the user can view the pay channel set. If he has not purchased yet and is not allowed to view the channel set without any action, the user is asked if he is willing to apply to purchase when he has selected the channel set. FIG. 23 shows a screen display example in such a case.

Another method is to transmit the user attribute information to the server, generate a channel set description corresponding to the user attribute information in the server, and send back.

The description above discussed an example in which a channel set description is rewritten for settings on channel view permission attribute. Replacing channels by rewriting the channel group description is also possible by a similar method.

Example of Changing Description According to Genre Information

Another example is to embed genre information in the channel set description and validate a channel only if the genre information matches the genre attribute determined on the basis of the user attribute information or the terminal attribute information for the receiving device 100F contained in the view attribute managing section 32. FIG. 24 is a description example of a channel set definition in which genre information is embedded. In the example, the channel "1" defined by a tag <accesskey> is allocated to a genre "company" by a tag <genre> as indicated by a statement 1801 enclosed by a broken line. The channel "2" is allocated to a genre "news" as indicated by a statement 1802 enclosed by a broken line. If the view attribute managing section 32 contains settings specifying "news" as the user's favorite genre, only channel 2 can be provided to the user.

Genre information was specified in the channel set description in the example above. A separate setup file may be provided in which genre information is embedded. The example concerned channels; the same arrangement is applicable to channel sets by a similar method whereby the user is presented with only a channel set that matches genre information, that is, filtering is done using the channel group description.

Confirmation before Application Program is Started

Some application programs which run on a receiving device of the present invention take time to start up. In that case, if application programs are quit and new application programs are started unconditionally upon every channel switching, and if the new channel is associated with an application program which takes time to start up, the user may feel uncomfortable with the long startup time.

To avoid such an event, if the user has selected an application program which takes time to start up, the user may be asked for a confirmation before the startup.

Configuration for Confirmation before Application Program is Started

Figure 25:
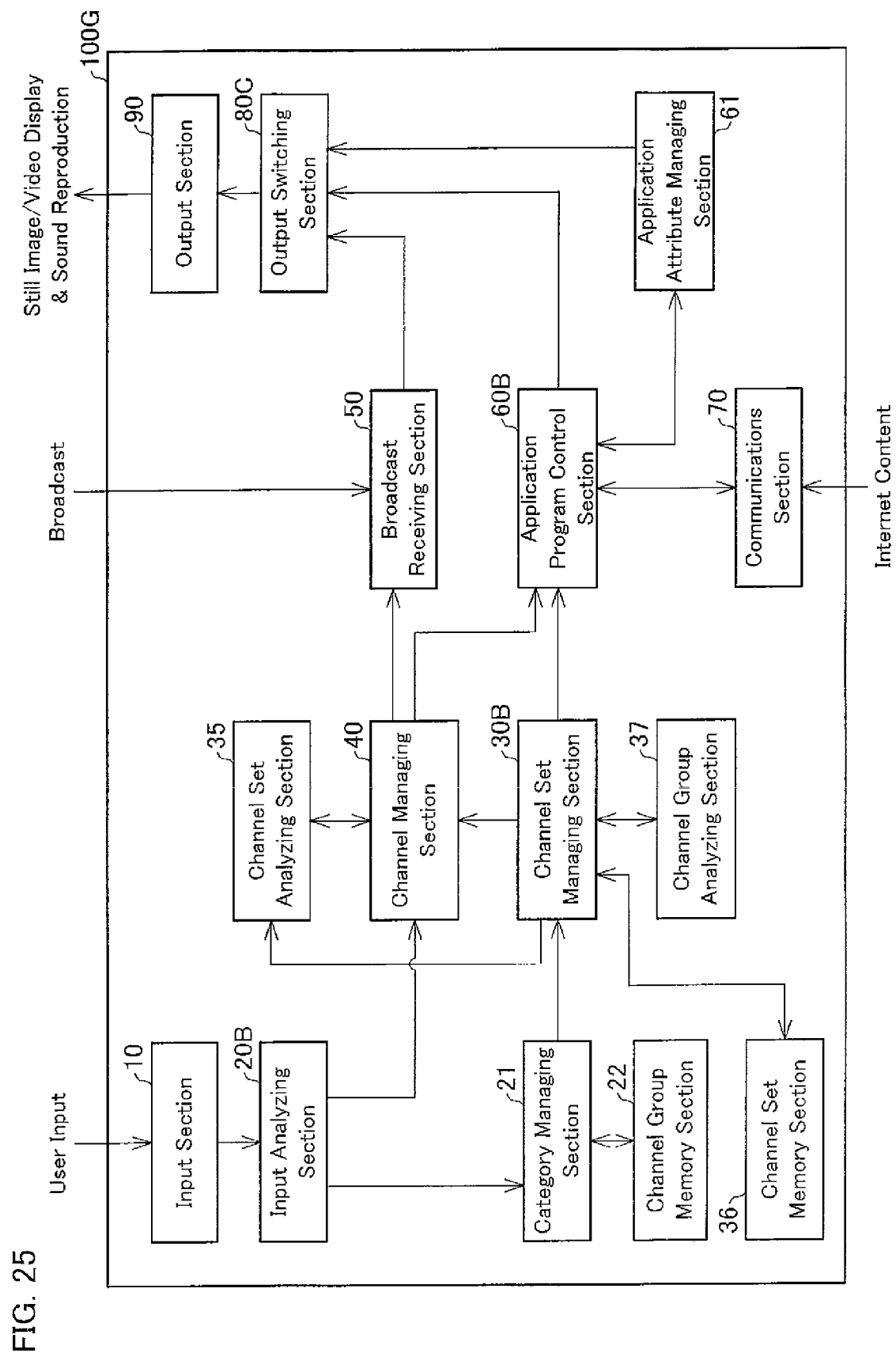
FIG. 25 is a function block diagram of a major part of a receiving device 100G adapted to ask for a confirmation before a startup of application programs in accordance with embodiment 1 of the present invention.

FIG. 25 shows a function block diagram of a major part of a receiving device 100G adapted so as to ask for a confirmation before starting up an application program. The following description will focus on the configuration and operation where additions or changes are made to the function block diagram shown in FIG. 7.

First, the channel set managing section 30B and the channel managing section 40 determines new channel sets and channels according to a user channel set or channel switching manipulation. If the new channel set or channel is associated with a different application program from currently running application programs, the channel set managing section 30B or the channel managing section 40 instructs the application program control section 60 to quit the current application programs and start up a new application program. In response to the instructions to quit the current application programs and start up a new application program, the application program control section 60 asks the application attribute managing section (application program attribute managing means) 61 whether the new application program which is to be started takes long to do so. The application attribute managing section 61 prerecords information on startup times of application programs which may be run on the receiving device 100G. The section 61 answers the enquiry from the application program control section 60 by informing of the startup time of the application program and at the same time, asks the user for a confirmation for startup of the application program via the output switching section 80C and the output section 90. If there is a user input indicating acceptance of the startup, the application attribute managing section 61 receives the user input over a path (not shown) and instructs the application program control section 60 to start up the application program. If there is an user input indicating rejection of the startup, the application attribute managing section 61 receives the user input over a path (not shown) and instructs the application program control section 60 to cancel the startup of the application program.

Figure 26:
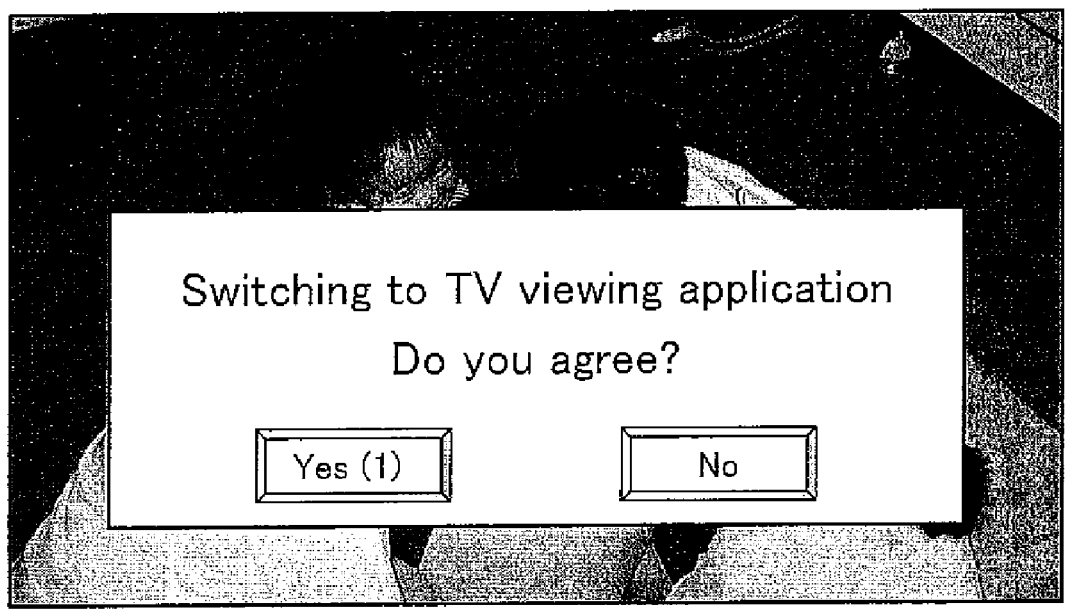
FIG. 26 is an illustration of a screen display example in accordance with embodiment 1 of the present invention where the receiving device 100G is asking the user for a confirmation as to whether or not to start up an application program.

Regarding steps in the channel selection manipulation on the receiving device 100G of the present invention, whether to start up an application program is determined in S7 in the flow chart shown in FIG. 3. The information on the startup time of the application program contained in the application program attribute managing section 61 is used in the determination. If the startup takes long, an enquiry screen is presented to the user, asking for a confirmation for startup, as in the example of screen shown in FIG. 26. Thus, the user is asked whether to start up the application program.

Embodiment 2

The configuration of embodiment 2 includes the configuration of embodiment 1 and also a channel set call function and a channel call function by which the names of channel sets or channels are presented to the user when the user is to switch between channel sets or channels or after such switching.

Configuration of Embodiment 2

Figure 27:
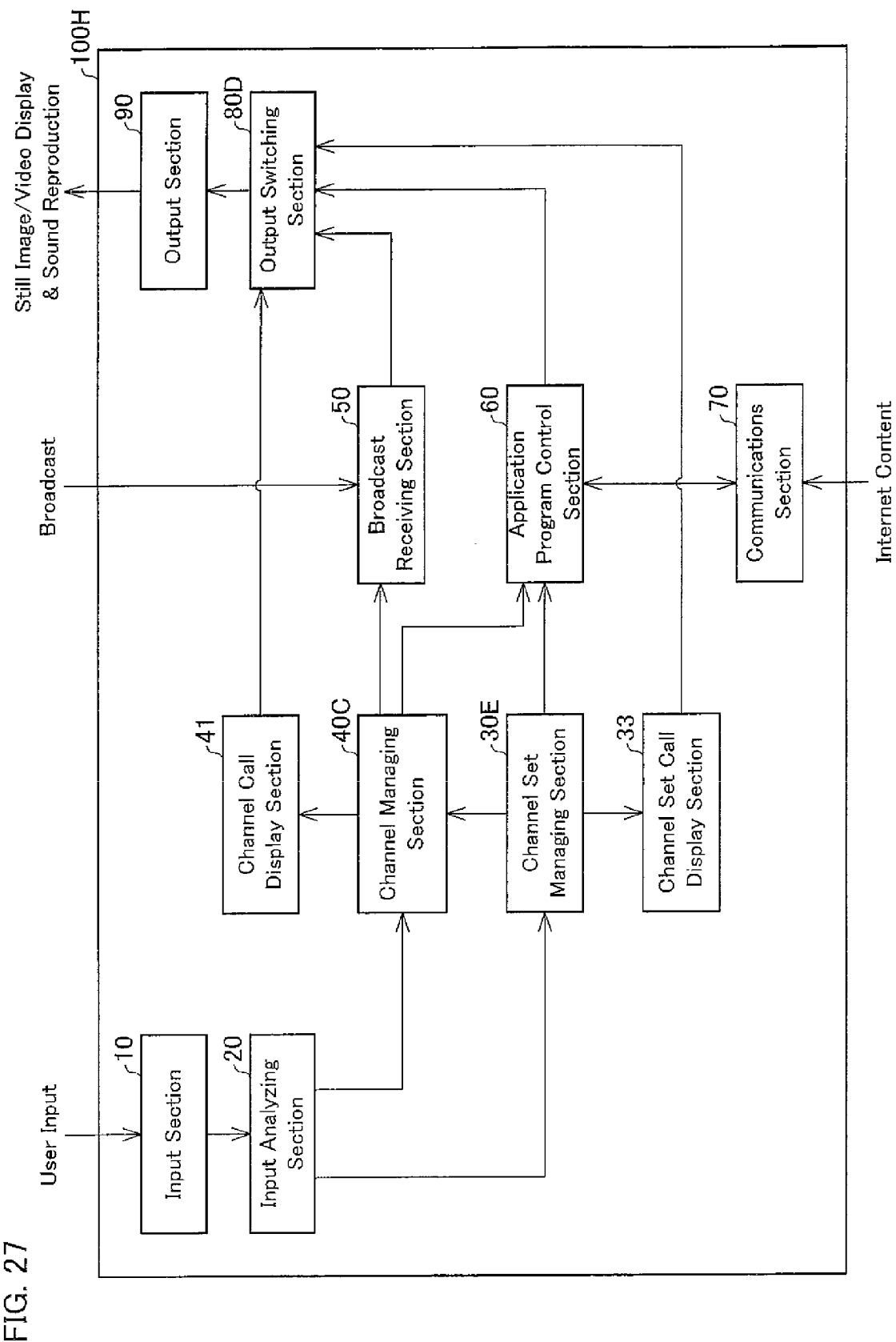
FIG. 27 is a function block diagram of a major part of a receiving device 100H in accordance with embodiment 2 of the present invention.

FIG. 27 is a function block diagram of a major part of a receiving device 100H in accordance with the present embodiment. The following description will focus on the configuration and operation where additions or changes are made to the function block diagram shown in FIG. 1. To simplify the function block diagram, FIG. 27 does not show function blocks representing the channel set analyzing section 35, the channel set memory section 36, and the channel group analyzing section 37.

First, the input analyzing section 20 receives user inputs on the input switching button or the channel selection buttons via the input section 10. The section 20 issues a channel set switching instruction or a channel switching instruction to the channel set managing section 30E or the channel managing section 40C according to the contents of the inputs. The channel set managing section 30E or the channel managing section 40C examines whether or not the user has activated a channel set call function and a channel call function. If the channel set call function and the channel call function are deactivated, the contents of the content being displayed is switched without displaying information on the channel call and channels on the screen of the receiving device 100H. If the channel set call function and the channel call function are activated, the channel set managing section 30E displays information on channel sets on the screen of the receiving device 100H in response to a press of the input switching button via a channel set call display section (channel set display means) 33. In addition, the channel managing section 40C displays information on channels on the screen of the receiving device 100H in response to a press of the channel selection buttons via a channel call display section (channel call display means) 41.

Display Example and Manipulation of Channel Set Call and Channel Call

In the present embodiment, by using the aforementioned configuration, the names and other information on channel sets and channels is displayed on the screen of the receiving device 100H upon a channel set or channel switching manipulation and when a new channel set or channel is entered.

Figure 28:
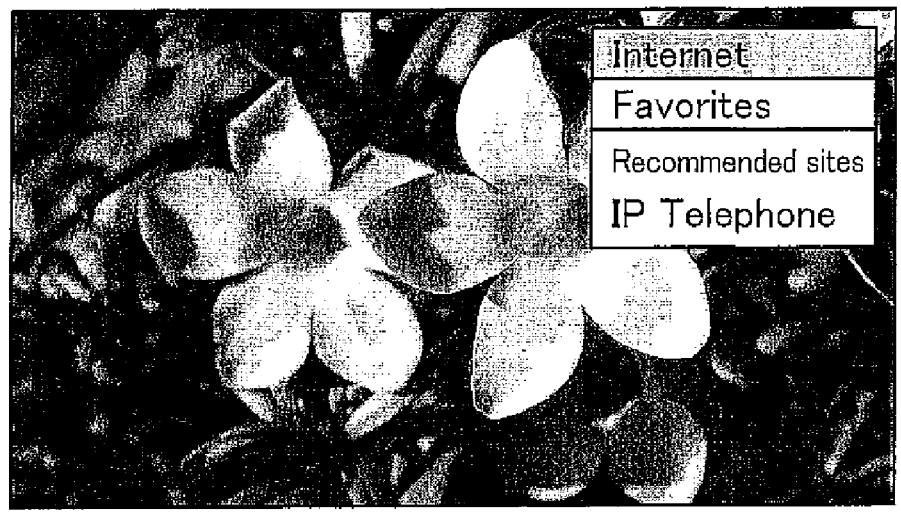
FIG. 28(a) shows a display example of a channel set call function used in a channel set switching manipulation in accordance with embodiment 2 of the present invention where a list of channel sets is being displayed on a screen of the receiving device 100H with the currently selected channel set name being highlighted.
FIG. 28(b) shows a display example of a channel set call function used in a channel set switching manipulation in accordance with embodiment 2 of the present invention where, for example, the list of channel set names displayed on a screen appears on a specified background image complete with icons associated with the channel set names.
Figure 28:
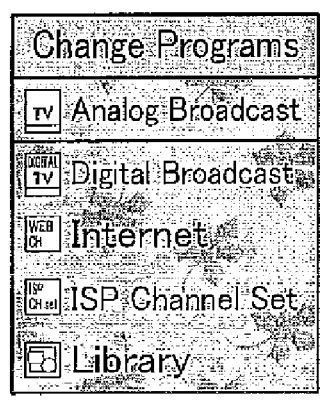

FIGS. 28(a) and 28(b) show an example of displays for the channel set call function upon a channel set switching manipulation. As illustrated in FIG. 28(a), in response to the user pressing the input switching button, the channel set call display section 33 displays a list of channel sets on the screen of the receiving device 100H with the name of the currently selected channel set being highlighted. By continuously pressing the input switching button, the highlight is moved within the list being displayed; a desired channel set is selectable by discontinuing the pressing of the input switching button when the name of the desired channel set is highlighted. As illustrated in FIG. 28(b), an image may be used as a background for the on-screen list of channel set names, and icons may be displayed which correspond to respective channel set names.

Furthermore, icons may be displayed which correspond to attribute information such as the genres embedded in the channel set description. The background color may be changed. For example, as mentioned earlier, the tag <genre> indicates genre information for each channel in the example of FIG. 24. According to the genre information, an icon indicating news may be displayed with news genre. A channel call being displayed on a yellow background for ordinary channels may be displayed on a blue background for news channels. It also becomes possible to present recommended channels from the service provider in such a way that the user can readily recognize them.

Figure 29:
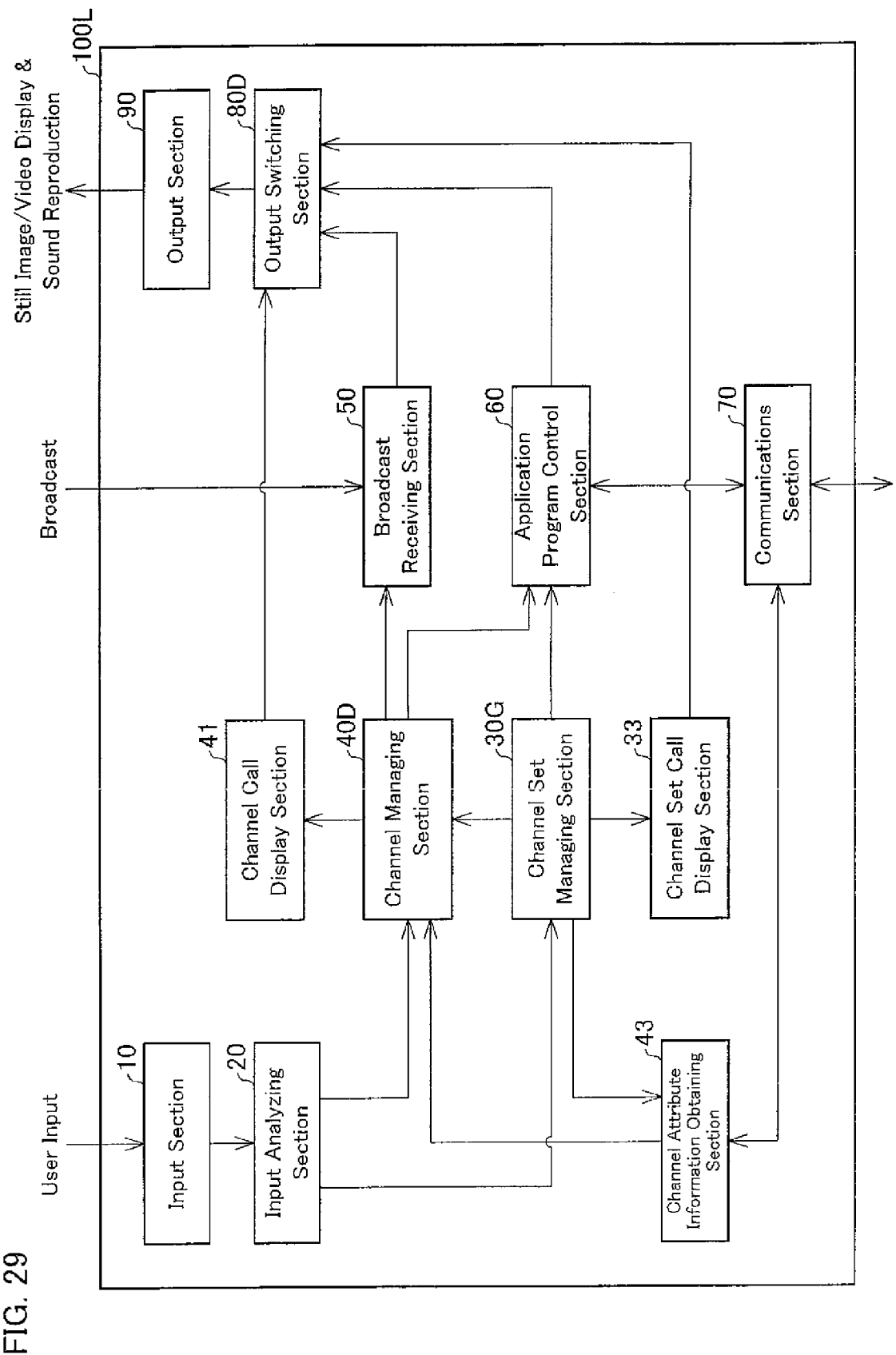
FIG. 29 is a function block diagram of a major part of a receiving device 100L, containing a channel attribute information obtaining section 43 in accordance with embodiment 2 of the present invention.

This attribute information is not only obtainable from the description in the channel set description, but obtainable separately. FIG. 29 shows a function block diagram of a configuration for such a case.

As illustrated in FIG. 29, the receiving device 100L is provided with a channel attribute information obtaining section 43.

The channel set managing section 30G notifies the channel attribute information obtaining section 43 of channel attribute information on channels in channel sets. The channel attribute information obtaining section 43 obtains channel attribute information on the channels through the communications section 70. The channel managing section 40D, upon display of the channel call, notifies also the channel call display section 41 of the channel attribute information obtained by the channel attribute information obtaining section 43. The channel call display section 41 displays the channel attribute information, as well as the channel information.

The channel attribute information may be displayed by icons or by changing background colors or background images as mentioned above, or by sounding an alarm. For example, the channel attribute information obtaining section 43 separately checks for an update of the URL assigned for each channel; if an updated channel is displayed, the user can be informed by an update mark, sound, etc.

The channel attribute information may be obtained after a channel is selected, when the channel managing section 40D has sent an obtain request to the channel attribute information obtaining section 43.

The description above has been concerned with channel attribute information. Attribute information on channel sets is similarly obtainable.

FIGS. 30(a) and 30(b) show an example of displays for the channel call function upon a channel switching manipulation. As illustrated in FIG. 30(a), in response to switching of channels by the user pressing a channel selection button, the channel call display section 41 displays information on the new channel on screen. In this example, it is understood that the contents of the channel which is the content being displayed is the "Gourmet—Recommended Dinner" channel in the "Internet" channel set. As illustrated in FIG. 30(b), it is also possible to simultaneously display information on the previous and next channels of the currently selected channel on screen. In the example of FIG. 30(b), information on only one previous channel and one next channel are displayed. Alternatively, information on multiple previous channels and multiple next channels may be displayed. The number of previous and next channels for which information is displayed upon a channel call may be varied depending on the category being selected.

Operation of Switching Only Channel (Set) Call Displays First

In the above configuration, the channel set call or the channel call switches channel sets or channels, displays the names of the channel sets or the channels on the screen of the receiving device 100H, and at the same time switches the content displayed on screen. When an input switching button or a channel selection button is pressed to switch channel sets or channels more quickly, the channel set call or the channel call does not switch the content displayed on screen, but switches only information on the channel set and the channel displayed on screen on the channel set call or the channel call. The content displayed on screen may actually be switched when an enter button is pressed or when a preset time has elapsed after an input switching button or a channel selection button was pressed. When the content is switched, the corresponding channel group description and channel set description are retrieved and executed respectively by the channel set managing section 30E and the channel managing section 40C to switch the content.

Steps of Switching Only Channel (Set) Call Displays First

Figure 31:
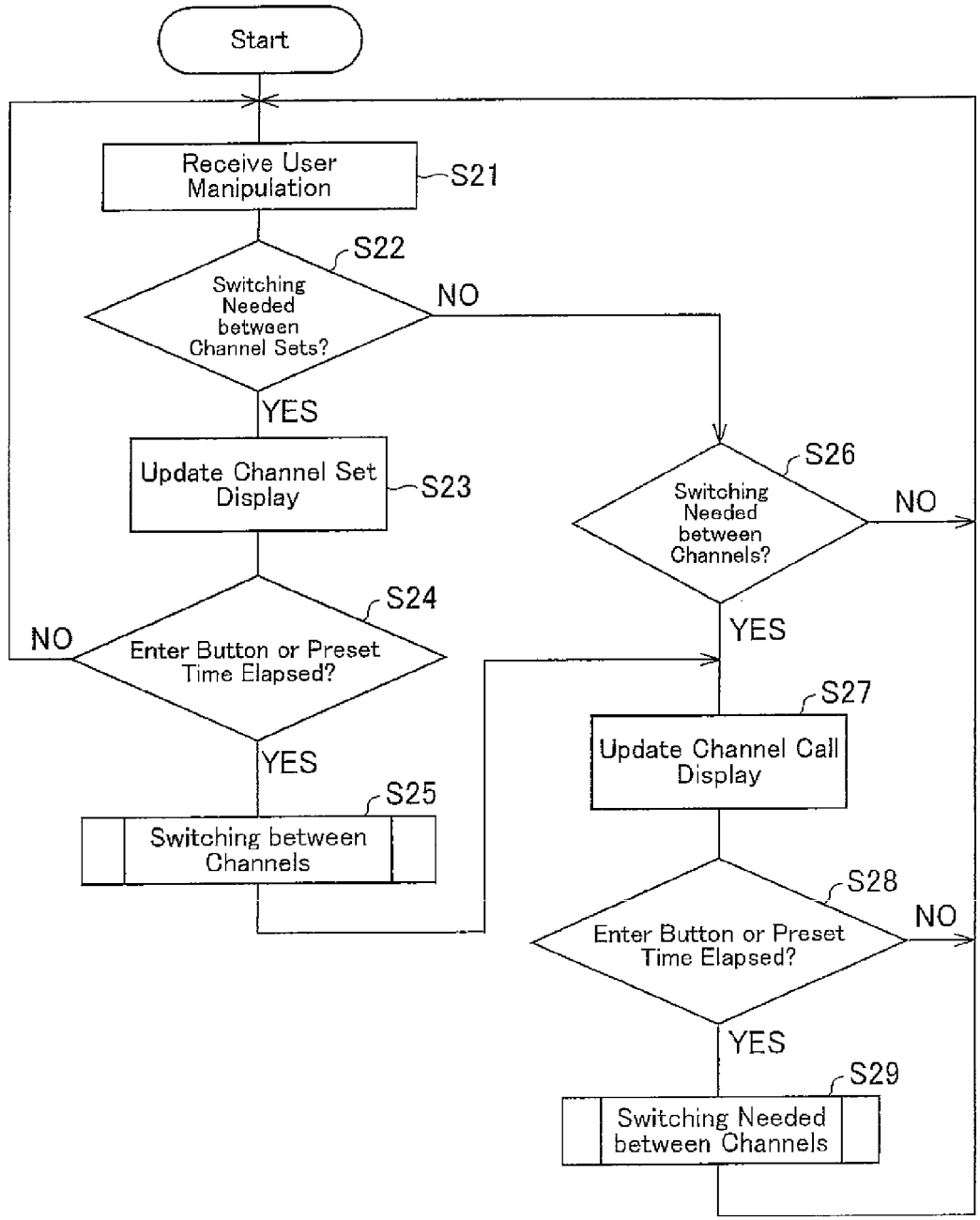
FIG. 31 is a flow chart illustrating a process of first switching only the display contents for a channel set call and a channel call and then switching the content displayed on the screen in accordance with embodiment 2 of the present invention.

FIG. 31 shows a flow chart for first switching only the display contents for the channel set call and the channel call and then switching content displayed on screen.

First, the input section 10 receives a user manipulation input (S21).

Next, the input analyzing section 20 determines whether or not the user manipulation input is for a switching between channel sets, that is, whether or not the input switching button has been pressed (S22). If the manipulation input is a channel set switch command, the process proceeds to a next step, or S23. If the manipulation input is not a channel set switch command, the process proceeds to S26.

Next, if the manipulation input is a channel set switch command, the channel set managing section 30E switches the display on the screen of the receiving device 100F from information on the current channel set to information on a next channel set via the channel set call display section 33 (S23).

Next, the input analyzing section 20 determines whether or not the enter button has been pressed and also whether or not a preset time has elapsed after an input switching button or a channel selection button was pressed (S24). If the enter button has not been pressed and also if the input switching button or the channel selection button was pressed for the second time within a preset time after the input switching button or the channel selection button had been pressed, the process proceeds to S21. If the enter button has been pressed or if a preset time elapsed after the input switching button or the channel selection button had been pressed, the process proceeds to a next step, or S25.

Next, the channel set managing section 30E switches channel sets (S25).

Next, if the selected channel set differs from the current channel set, the channel managing section 40C switches the display of a channel call to the one corresponding to the channel that was viewed the last time in the newly selected channel set, via the channel call display section 41 (S27).

Next, the input analyzing section 20 determines whether or not the enter button has been pressed and also whether or not a preset time has elapsed after an input switching button or a channel selection button was pressed (S28). If the enter button has not been pressed and also if the input switching button or the channel selection button was pressed for the second time within a preset time after the input switching button or the channel selection button had been pressed, the process proceeds to S21. If the enter button has been pressed or if a preset time elapsed after the input switching button or the channel selection button had been pressed, the process proceeds to a next step, or S29.

Next, the channel managing section 40C switches channels (S29). The step switches the screen display of actual content to contents corresponding to the new channel set and channel. Thereafter, the process returns to S21, waiting for a new user input.

In S22, if the user manipulation input is not a channel set switch command, it is determined whether or not the manipulation input is for a switching between channels, i.e. whether or not a channel selection button has been pressed (S26). If the manipulation input is a channel switch command, the process proceeds to a next step, or S27. The channel set managing section 30E updates the channel call display via the channel set call display section 33. If it is not a channel switch command, the process proceeds to S21, waiting for a new user input.

Embodiment 3

In embodiment 3, channels are displayed to the user in the form of a list.

Configuration of Embodiment 3

Figure 32:
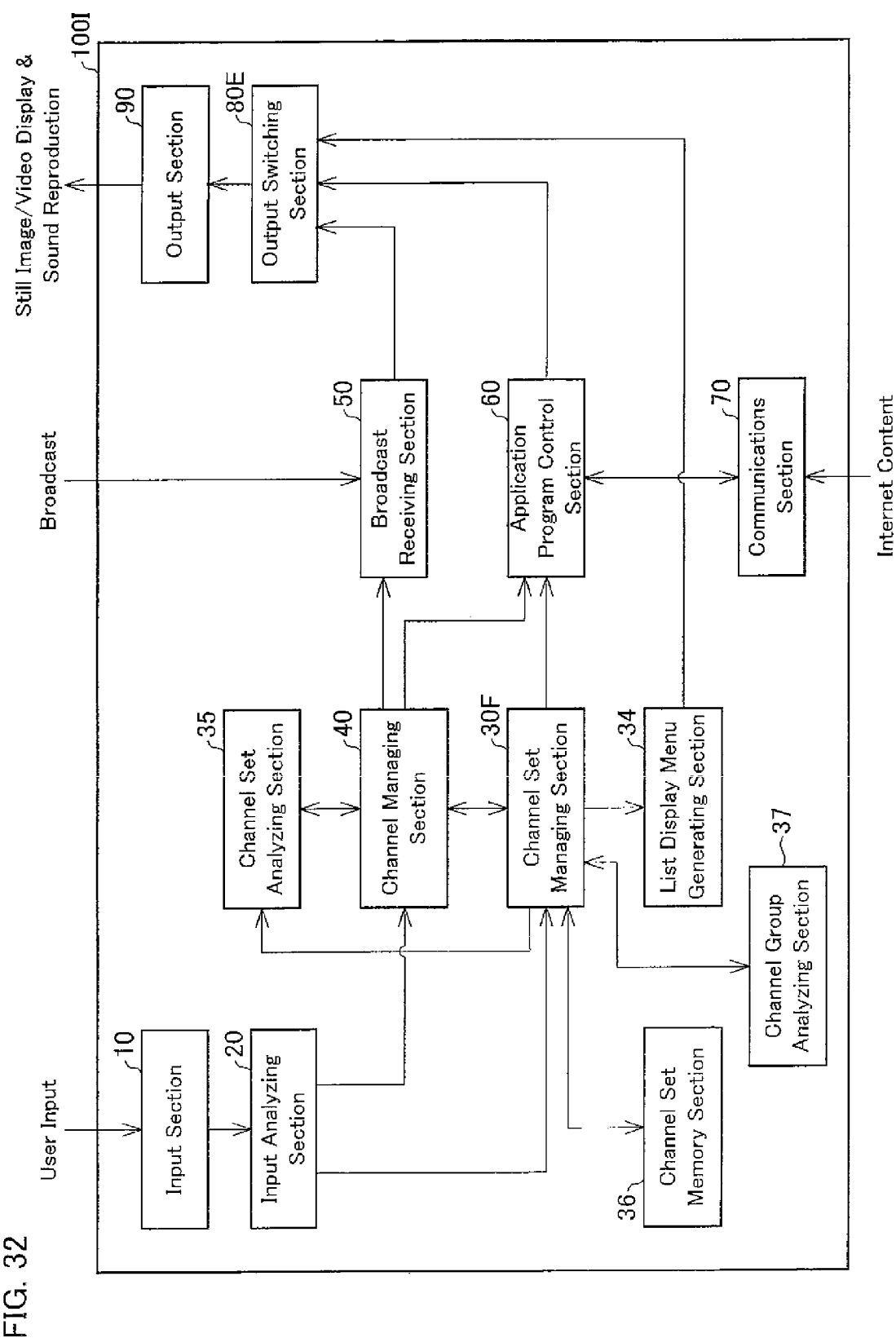
FIG. 32 is a function block diagram of a major part of a receiving device 100I in accordance with embodiment 3 of the present invention.

FIG. 32 is a function block diagram of a major part of a receiving device 100I in accordance with the present embodiment. The following description will focus on the configuration and operation where additions or changes are made to the function block diagram shown in FIG. 1.

First, the input analyzing section 20 recognizes a particular user manipulation input and informs the channel set managing section 30F that the manipulation input is a command to display a list display menu for channels on screen. Since the manipulation input is a command to display a list display menu for channels, the channel set managing section 30F instructs the list display menu generating section 34 to display a list of channels and provides a channel set description. According to the instruction from the channel set managing section 30F, the list display menu generating section 34 analyzes the channel set description received again and makes a channel list display screen for display on the screen of the receiving device 100I. Here, the list display menu generating section 34 produces the list display menu only from the channel set description. Alternatively, the section 34 may simultaneously receives a channel group description to produce the list display menu using also the channel group description.

The design of the list display menu produced here is predetermined in the receiving device 100I. Alternatively, multiple designs may be prepared so that the design to be used can embedded in the channel set description. In addition, the design itself may be stored in the service server so that it can be obtained via the communications section 70.

Channel List Display and Selection Method

FIG. 33 shows an example of the channel list display menu displayed on the screen of the receiving device 100I in the configuration of embodiment 3. The list display menu is displayed by providing a menu display button on the input section 10 and pressing the menu display button. Alternatively, it may be configured to be displayed by an long press of a channel selection button. In that case, there is no need to provide a channel list display menu button on the remote controller as in conventional art.

The list display menu may be displayed when a channel set is selected. In that case, the channel set description may have embedded therein a setting as to whether or not to generate the menu display when a channel set is selected.

The menu display in FIG. 33 has three columns by four lines with an icon and title for each channel. Similarly to the display to the channel call mentioned above, attribute information, update history, etc. for the channels may be displayed together.

The information may be embedded in the channel set description when the attribute information, update history, etc. for the channels are checked. Alternatively, there may be provided a channel attribute information obtaining section (not shown) similarly to the display for a channel call described in embodiment 2 so that the channel attribute information obtaining section can obtain the information. In that case, the channel attribute information obtaining section obtains attribute information and update information for each channel via the communications section 70 in response to an instruction from the channel set managing section 30F. The attribute information and update information obtained for each channel are transferred together with channel set information upon an instruction from the channel set managing section 30F to the list display menu generating section 34 so that a menu can be generated by the list display menu generating section 34.

FIG. 34 shows an example of a menu display including attribute information and update information for each channel. In the example, channels 2 and 6 are shown with a "Recommended!" icon (channel attribute information) so that the user can at a glance recognize these channels as being recommended by the service server. Also, channels 7 and 9 are shown with a "NEW" icon (update information) so that the user can at a glance recognize these channels as having been updated.

In the display of a list display menu in FIGS. 33 and 34, the channels are assigned one-to-one to the three columns by four lines numeric buttons of the remote controller. By displaying in the three columns by four lines format like this, the user can select from channels corresponding one-to-one to the numeric buttons by using the numeric buttons also when a channel list display menu is displayed so that the user can select a channel.

Furthermore, a channel may be selectable by pressing a channel selection button, rather than a numeric button, while a channel list display is being displayed on the screen of the receiving device 100I. In that case, if the button ▲ of the buttons ▲ and ▼ (channel selection buttons) is pressed with the channel in line 3 being selected, the channel in line 4, in the same column, becomes selected.

Here, the numeric buttons on the remote controller corresponding to the channel list display menu are assigned individually to different pieces of content. When the button is pressed, the particular piece of content corresponding to the pressed button is reproduced. As another configuration, each button may be associated with a channel set and a group of channels to be switched by a press of the button. In that case, when the user presses a button, the channel set managing section 30F is notified of the channel set and the group of channels via the input section 10 and the input analyzing section 20. The channel set managing section 30F notifies the channel set analyzing section 35 of the specified channel set and passes control to the channel managing section 40. The channel managing section 40 performs the aforementioned channel control according to the specified channel.

Changing Channels from within Content

A similar mechanism can be used to change channels from within content. FIG. 35 is a description example for embedding a channel transition command inside content. In the example, as the user selects a text string "To Favorites Channel" displayed on the screen of the receiving device 100I, the channel set managing section 30F switches the current channel set to a channel set description net_reco.csd in a channel group description net.ind. The channel managing section 40 switches the current channel to a channel with a channel identifier "001" which is the first channel in the channel set description net_reco.csd.

Supplement

The description so far has taken the receiving device provided with the broadcast receiving section 50 as an example. Alternatively, there may be provided an external input section for receiving external inputs. In addition, the receiving device may not be provided with either the broadcast receiving section 50 or the external input section and handle only Net content via the communications section 70.

The receiving device 100 of the present invention may be provided not only in a television receiver capable of receiving Net content, but also in a mobile terminal, a mobile phone, a facsimile transmitter/receiver, etc.

Furthermore, the description so far has been concerned with examples in which the individual means of the present invention are implemented to a receiving device, This is not the only possibility; the means may be implemented on a service server on a network. In that case, the receiving device receives user inputs, etc. and notifies the service server via the communications section 70. The service server performs the processes described earlier and returns a result to the receiving device so that the receiving device can display the result.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, the blocks of the receiving device of the present invention, especially, the input analyzing section 20, the channel set managing section 30, the channel managing section 40, and the application program control section 60, may be realized by hardware or software executed by a CPU as follows:

The receiving device of the present invention includes a CPU (central processing unit) and memory devices (storage media). The CPU executes instructions contained in control programs, realizing various functions. The memory devices may be a ROM (read only memory) which contains programs, a RAM (random access memory) to which the programs are loaded, or a memory containing the programs and various data. The objective of the present invention can be achieved by mounting to the receiving device a computer-readable storage medium control program code (executable programs, intermediate code programs, or source programs) for the information processing device of the present invention, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The receiving device of the present invention may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired lines, such as IEEE 1394, USB, electric power line, cable TV line, telephone line, or ADSL; or wireless, such as infrared (IrDA, remote control), Bluetooth®, 802.11 wireless, HDR, mobile telephone network, satellite line, or terrestrial digital network. The present invention encompasses a carrier wave or data signal transmission in which the program code is embodied electronically.

INDUSTRIAL APPLICABILITY

The present invention enables collective handling of Net content channels as well as broadcast channels in the units of channel sets. The user can readily handle large numbers of channels when compared with cases where increasing channels are all handled equally without being grouped. The invention is thus widely preferable to various systems including information appliances and mobile electron devices.

The invention claimed is:

1. A receiving device comprising:
an input section operable to input user selections of a selected channel set made up of a collection of channels that are compiled together as a channel set according to at least one common rule, the channels in any given channel set being made up of information channels including Net content;
a memory section containing channel set descriptions of each of the channel sets including data by which to identify information content including Net content corresponding to the channels of each channel set;
an input analyzing section connected to receive the user selections input through the input section and to analyze each received user selection to output an indication of a selection of a selected channel set when the user selection designates the selected channel set for selection;
a channel set managing section connected to receive the indication of the selection of the selected channel set from the input analyzing section to obtain a channel set description from the memory section corresponding to the selected channel set when the selected channel set is different from a current channel set; and
a channel managing section responding to the obtained channel set description in order to change channels within the selected channel set when channel change instructions have also been input by the input section, wherein:
the channel set descriptions contain therein a name of a second channel set description listing lists of multiple channels for each of the channels; and
the second channel set description contains therein an identifier for one of the channel set descriptions that references the second channel set description.

2. The receiving device of claim 1, further comprising:
an application program control section storing multiple application programs associated with the channels, switching between the application programs for execution according to channel selection, and starting up one of the application programs according to the channel selection, the application programs enabling the user to manipulate the information based on the channel selection.

3. The receiving device of claim 1, wherein display methods are changed for display of a channel set and for display of a second channel set.

4. The receiving device of claim 1, further comprising at least either one of:
a reading section as the channel set description section operable to obtain the channel set descriptions from a storage medium; and
a communications section as the channel set description section operable to obtain the channel set descriptions from an external device over a network.

5. The receiving device of claim 4, wherein:
the channel set descriptions contain therein a location from which channel set descriptions are newly obtained; and
the channel set managing section updates the channel set descriptions via the communications section based on the description of the location.

6. The receiving device of claim 1, further comprising:
a channel set sorting section rearranging the display sequence of channel sets,
wherein
the channel set sorting section rearranges a display sequence of the channel sets by at least either one of a sequence of updating of the channel sets and access frequency of the channel sets in presenting the channel sets to the user.

7. The receiving device of claim 1, further comprising:
a channel set description generating section generating channel set descriptions for storage in the memory section with each generated channel set description being a list of channels in a channel set from a file containing a collection of URL links written in XML, HTML, SVG, RSS, CSV, or plain text, the file being stored in the receiving device.

8. The receiving device of claim 1, further comprising:
a channel set description generating section generating channel set descriptions for storage in the memory section with each generated channel set description being a list of channels in a channel set from a file containing a collection of URL links written in XML, HTML, SVG, RSS, CSV, or plain text, the file being received from a service server.

9. The receiving device of claim 8, further comprising:
a second URL list managing section obtaining a second list of URLs,
wherein
the channel set description generating section generates the channel set descriptions from the file containing a collection of URL links and the second list of URLs obtained separately from the file by the second URL list managing section.

10. The receiving device of claim 1, further comprising:
an attribute managing section storing user attribute information and receiving device attribute information,
wherein
the channel set managing section compares either the user attribute information or the receiving device attribute information stored in the attribute managing section to the channel set descriptions and changes channel sets presented to the user.

11. The receiving device of claim 1, further comprising:
a channel set display section presenting information on the current channel set or information on the selected channel set to the user during switching between channel sets; and a channel call display section presenting information on an old or new channel to the user during switching between channels.

12. The receiving device of claim 11, wherein the channel call display section changes a background design for a channel call according to channel attribute information contained in the channel set descriptions.

13. The receiving device of claim 1, further comprising:
a list display menu generating section generating a list of channels from the channel set descriptions to present the list to the user as a list display menu.

14. The receiving device of claim 13, wherein:
the channel set descriptions contain a type of the list display menu; and
the list display menu generating section changes a display of the list display menu according to the type.

15. The receiving device of claim 13, wherein the list display menu generating section assigns the channels to respective buttons on an input device and displays the list of channels.

16. A server for providing the channel set descriptions to the receiving device of claim 1 over a network in response to a request from the receiving device.

17. A television receiver connectable to the Internet, said receiver comprising the receiving device of claim 1.

18. A mobile terminal connectable the Internet, said terminal comprising the receiving device of claim 1.

19. A system, comprising: the receiving device of claim 1.

20. A method comprising:
inputting user selections of a selected channel set made up of a collection of channels that are compiled together as a channel set according to at least one common rule as to each channel in the channel set, the channels in any given channel set being made up of information channels including Net content;
storing channel set descriptions of each of the channel sets including data by which to identify information corresponding to the selected channels in a store; and
obtaining one of the channel set descriptions corresponding to the selected channel set from the store in order to switch from the current channel set to the selected channel set in accordance with a selected channel set description when the user has selected one of the channel sets in the inputting step, wherein:
the channel set descriptions contain therein a name of a second channel set description listing lists of multiple channels for each of the channels; and
the second channel set description contains therein an identifier for one of the channel set descriptions that references the second channel set description.

21. A computer-readable non-transitory storage medium containing an information processing program for causing a computer to operate as individual sections in a receiving device comprising:
an input section operable to input user selections of a selected channel set made up of a collection of channels that are compiled together as a channel set according to at least one common rule, the channels in any given channel set being made up of information channels including Net content;
a memory section containing channel set descriptions of each of the channel sets including data by which to identify information content including Net content corresponding to the channels of each channel set;
an input analyzing section connected to receive the user selections input through the input section and to analyze each received user selection to output an indication of a selection of a selected channel set when the user selection designates the selected channel set for selection;
a channel set managing section connected to receive the indication of the selection of the selected channel set from the input analyzing section to obtain a channel set description from the memory section corresponding to the selected channel set; and
a channel managing section responding to the obtained channel set description in order to change channels within the selected channel set when channel change instructions have also been input by the input section, wherein:
the channel set descriptions contain therein a name of a second channel set description listing lists of multiple channels for each of the channels; and
the second channel set description contains therein an identifier for one of the channel set descriptions that references the second channel set description.

22. A receiving device comprising:
an input section operable to input user selections of a selected channel being made up of an information channel including Net content;
a receiving section receiving a selected information channel an output section operable to output a selected information channel to the user;
a memory section containing channel set descriptions a plurality of channel sets, each channel set including data by which to identify information corresponding to the selected channels;
a channel set managing section managing classified channels as channel sets one of which can be selected by a manipulation input to the input section, wherein the channel set managing section obtains, from the memory section, one of the channel set descriptions corresponding to the selected channel set in order to switch from the current channel set to a channel set in accordance with a selected channel set description when the user has selected one of the channel sets;
a channel managing section, in response to a manipulation input to the input section, enabling selection of one of channels classified to the selected channel set; and
a communications section for connecting to a server, wherein:
the channel set managing section obtains a channel set description from the server via the communications section to update the channel sets in the memory section;
the channel set descriptions contain therein a name of a second channel set description listing lists of multiple channels for each of the channels; and
the second channel set description contains therein an identifier for one of the channel set descriptions that references the second channel set description.

* * * * *